United States Patent
Ye et al.

(10) Patent No.: US 12,289,732 B2
(45) Date of Patent: *Apr. 29, 2025

(54) EARLY TERMINATION SIGNAL AND HARQ-ACK FEEDBACK FOR PUSCH

(71) Applicant: Apple Inc., Cupertino, CA (US)

(72) Inventors: Qiaoyang Ye, San Jose, CA (US); Debdeep Chatterjee, San Jose, CA (US); Gang Xiong, Beaverton, OR (US); Bharat Shrestha, Hillsboro, OR (US); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 778 days.

This patent is subject to a terminal disclaimer.

(21) Appl. No.: 17/470,429

(22) Filed: Sep. 9, 2021

(65) Prior Publication Data

US 2022/0070840 A1    Mar. 3, 2022

Related U.S. Application Data

(63) Continuation of application No. 16/496,882, filed as application No. PCT/US2018/023368 on Mar. 20, 2018, now Pat. No. 11,122,553.
(Continued)

(51) Int. Cl.
*H04W 72/23*    (2023.01)
*H04L 1/1829*    (2023.01)
*H04W 76/30*    (2018.01)

(52) U.S. Cl.
CPC ........... *H04W 72/23* (2023.01); *H04L 1/1861* (2013.01); *H04W 76/30* (2018.02)

(58) Field of Classification Search
None
See application file for complete search history.

(56) References Cited

U.S. PATENT DOCUMENTS

| 11,122,553 B2 | 9/2021 | Ye et al. |
| 2014/0362832 A1 | 12/2014 | Rudolf et al. |

(Continued)

FOREIGN PATENT DOCUMENTS

| CN | 102197618 A | 9/2011 |
| CN | 102668482 | 9/2012 |

(Continued)

OTHER PUBLICATIONS

Extended European Search Report for Patent Application No. EP 18772294; Nov. 20, 2020; 8 Pages.
(Continued)

*Primary Examiner* — Ayman A Abaza
*Assistant Examiner* — Camquyen Thai
(74) *Attorney, Agent, or Firm* — Kowert, Hood, Munyon, Rankin & Goetzel, P.C.

(57) ABSTRACT

Systems and methods of early termination of uplink data transmissions for a UE are described. The UE transmits capacity information that indicates that the UE supports use of an ETS. The ETS indicates successful reception by the eNB of the uplink data prior to an end of a scheduled transmission period to transmit repeated instances of the data. The UE receives a schedule for repeated transmissions of the data that is based on a coverage level of the UE, and then transmits sets of one or more repetitions. After the transmission, the UE monitors a predetermined resource whether the ETS is present or whether the ETS indicates an
(Continued)

ACK. If the ETS indicates successful reception, the UE terminates transmission of the remaining repetitions of the data and enters a sleep mode or transmits other uplink data.

20 Claims, 11 Drawing Sheets

Related U.S. Application Data

(60) Provisional application No. 62/586,746, filed on Nov. 15, 2017, provisional application No. 62/568,185, filed on Oct. 4, 2017, provisional application No. 62/562,027, filed on Sep. 22, 2017, provisional application No. 62/543,031, filed on Aug. 9, 2017, provisional application No. 62/502,367, filed on May 5, 2017, provisional application No. 62/476,085, filed on Mar. 24, 2017.

(56) References Cited

U.S. PATENT DOCUMENTS

2017/0303248 A1* 10/2017 Chatterjee ............... H04L 1/189
2018/0278371 A1* 9/2018 Chien ................... H04L 1/0025

FOREIGN PATENT DOCUMENTS

| CN | 105794280 A | 7/2016 |
|---|---|---|
| WO | 2016073591 A1 | 5/2016 |
| WO | 2016/119232 A1 | 8/2016 |
| WO | 2016167581 A1 | 10/2016 |
| WO | 2018172486 A1 | 9/2018 |
| WO | 2018175446 A1 | 9/2018 |

OTHER PUBLICATIONS

International Application Serial No. PCT/US2018/023368, International Search Report mailed Jun. 20, 2018, 3 pages.
International Application Serial No. PCT/US2018/023368, Written Opinion mailed Jun. 20, 2018, 9 pages.
Sony, "Feedbacks for improving URLLC reliability," R1-1703123, 3GPP TSG RAN WG1 Meeting #88, Athens, Greece, Feb. 7, 2017, 4 pages.
Sony, "Feedbacks for URLLC transmission," R1-1700687, 3GPP TSG RAN WG1 NR Ad-Hoc Meeting, Spokane, USA Jan. 9, 2017, 7 pages.
Office Action for CN Patent Application No. 2022106565908; Dec. 21, 2023.
Mediatek Inc "TP on DPCH Frame Early Termination"; 3GPP TSG RAN WG1 Meeting #72bis R1-131169; Apr. 15, 2013.
Mediatek Inc "TP on Uplink DCH Enhancements"; 3GPP TSG RAN WG1 Meeting #74 R1-133783; Aug. 19, 2013.
Chinese Office Action; Chinese Application No. 201880020630.1; mailed Oct. 27, 2021; 18 pgs.

* cited by examiner

EARLY TERMINATION SIGNAL AND HARQ-ACK FEEDBACK FOR PUSCH

PRIORITY CLAIM

This application is a continuation of U.S. patent application Ser. No. 16/496,882, filed Sep. 23, 2019, entitled "DESIGN OF EARLY TERMINATION SIGNAL AND HARQ-ACK FEEDBACK FOR PUSCH", which is a U.S. National Stage filing under 35 U.S.C. 371 from International Application No. PCT/US2018/023368, filed Mar. 20, 2018, entitled "DESIGN OF EARLY TERMINATION SIGNAL AND HARQ-ACK FEEDBACK FOR PUSCH", which claims the benefit of priority to U.S. Provisional Patent Application Ser. No. 62/476,085, filed Mar. 24, 2017, entitled "DESIGN OF EARLY TERMINATION SIGNAL AND HARQ-ACK FEEDBACK FOR PUSCH IN EFEMTC," U.S. Provisional Patent Application Ser. No. 62/502,367, filed May 5, 2017, entitled "EARLY TERMINATION SIGNAL AND HARQ-ACK FEEDBACK FOR PUSCH IN EFEMTC," U.S. Provisional Patent Application Ser. No. 62/543,031, filed Aug. 9, 2017, entitled "EARLY TERMINATION SIGNAL AND HYBRID AUTOMATIC REPEAT REQUEST ACKNOWLEDGEMENT (HARQ-ACK) FEEDBACK FOR PHYSICAL UPLINK SHARED CHANNEL (PUSCH) IN EVEN FURTHER ENHANCED MACHINE TYPE COMMUNICATION (EFEMTC)," U.S. Provisional Patent Application Ser. No. 62/562,027, filed Sep. 22, 2017, entitled "EARLY TERMINATION SIGNAL AND HYBRID AUTOMATIC REPEAT REQUEST ACKNOWLEDGEMENT (HARQ-ACK) FEEDBACK FOR PHYSICAL UPLINK SHARED CHANNEL (PUSCH) IN EVEN FURTHER ENHANCED MACHINE TYPE COMMUNICATION (EFEMTC)." U.S. Provisional Patent Application Ser. No. 62/568,185, filed Oct. 4, 2017, entitled "EARLY TERMINATION SIGNAL AND HYBRID AUTOMATIC REPEAT REQUEST ACKNOWLEDGEMENT (HARQ-ACK) FEEDBACK FOR PHYSICAL UPLINK SHARED CHANNEL (PUSCH) IN EVEN FURTHER ENHANCED MACHINE TYPE COMMUNICATION (EFEMTC)," U.S. Provisional Patent Application Ser. No. 62/586,746, filed Nov. 15, 2017, entitled "EARLY TERMINATION SIGNAL AND HYBRID AUTOMATIC REPEAT REQUEST ACKNOWLEDGEMENT (HARQ-ACK) FEEDBACK FOR PHYSICAL UPLINK SHARED CHANNEL (PUSCH) IN EVEN FURTHER ENHANCED MACHINE TYPE COMMUNICATION (EFEMTC)," each of which is incorporated herein by reference in its entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks (RANs). Some embodiments relate to Machine Type Communication (MTC) UEs in cellular and wireless local area network (WLAN) networks, including Third Generation Partnership Project Long Term Evolution (3GPP LTE) networks and LTE advanced (LTE-A) networks as well as legacy networks, 4th generation (4G) networks and 5th generation (5G) networks. Some embodiments relate to Hybrid Automatic Repeat Requests (HARQs) and early termination of HARQs for MTC UEs.

BACKGROUND

The use of 3GPP LTE systems (including LTE and LTE-A systems) has increased due to both an increase in the types of devices user equipment (UEs) using network resources as well as the amount of data and bandwidth being used by various applications, such as video streaming, operating on these UEs. In particular, typical UEs such as cell phones, Internet of Things (IoT) UEs and narrowband (NB)-IoT UEs currently use 3GPP LTE systems. IoT UEs, which may include machine-type communications (MTC) UEs, and NB-IoT UEs pose particular challenges as such UEs are typically low cost devices that have low power consumption, and thus have smaller batteries and smaller communication ranges. Examples of such UEs include sensors (e.g., sensing environmental conditions) or microcontrollers in appliances or vending machines. The number of MTC UEs in use is expected to be massive, thus leading to further development as networks attempt to accommodate for the disparate requirements of the different types of UEs. Work is ongoing to introduce enhancements to achieve even lower power consumption, to make more efficient use of network resources.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
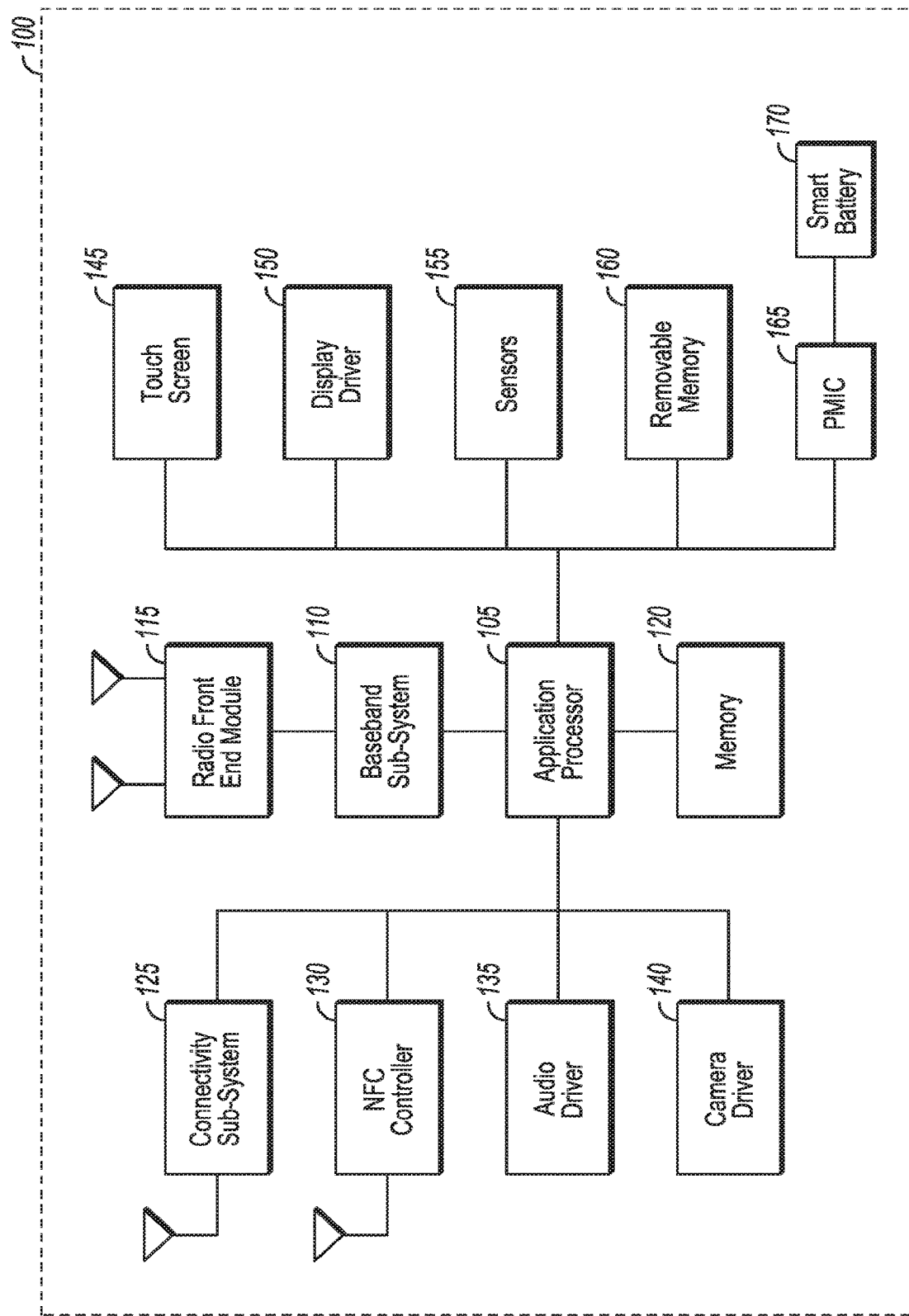
FIG. 1 illustrates a UE in accordance with some embodiments.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
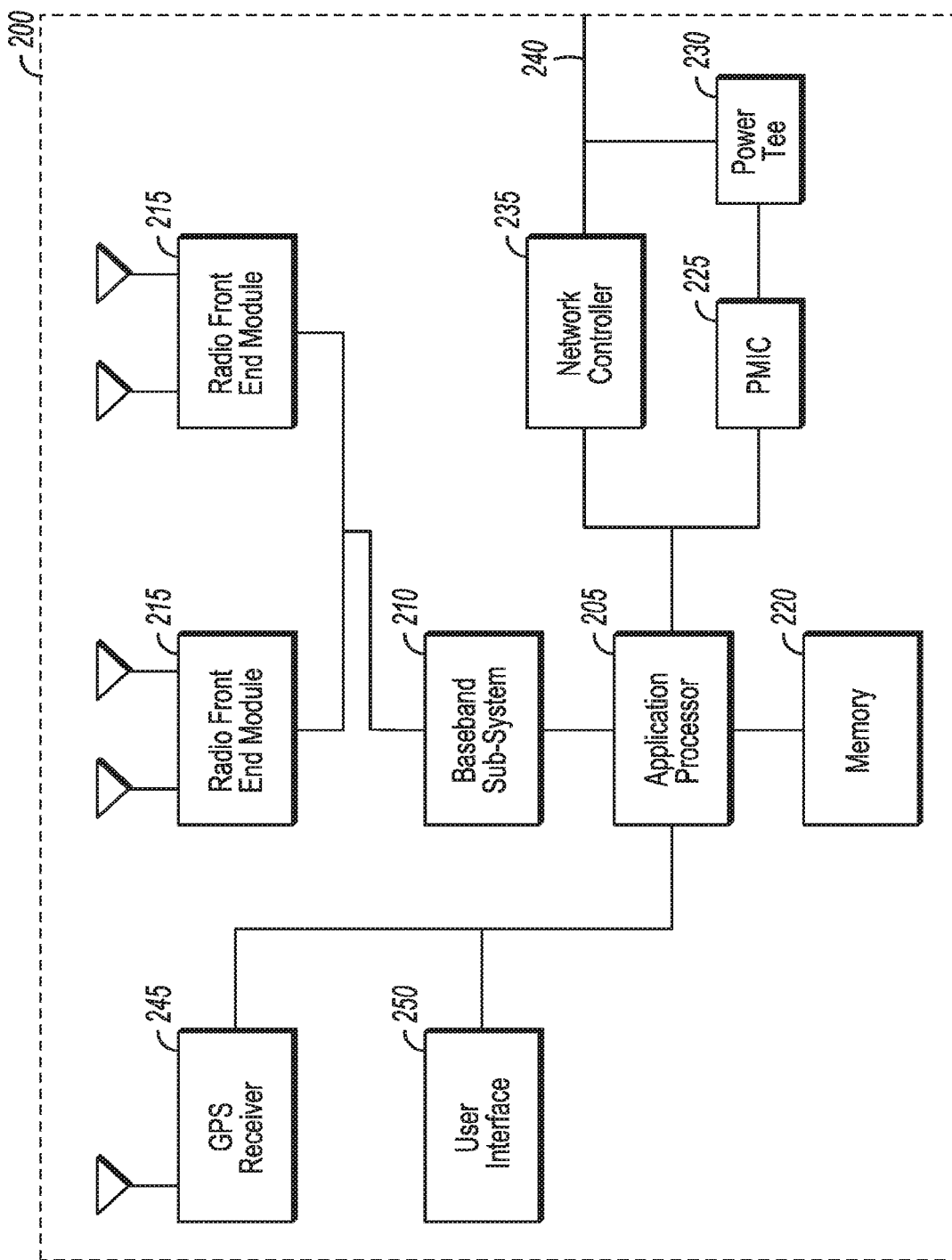
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
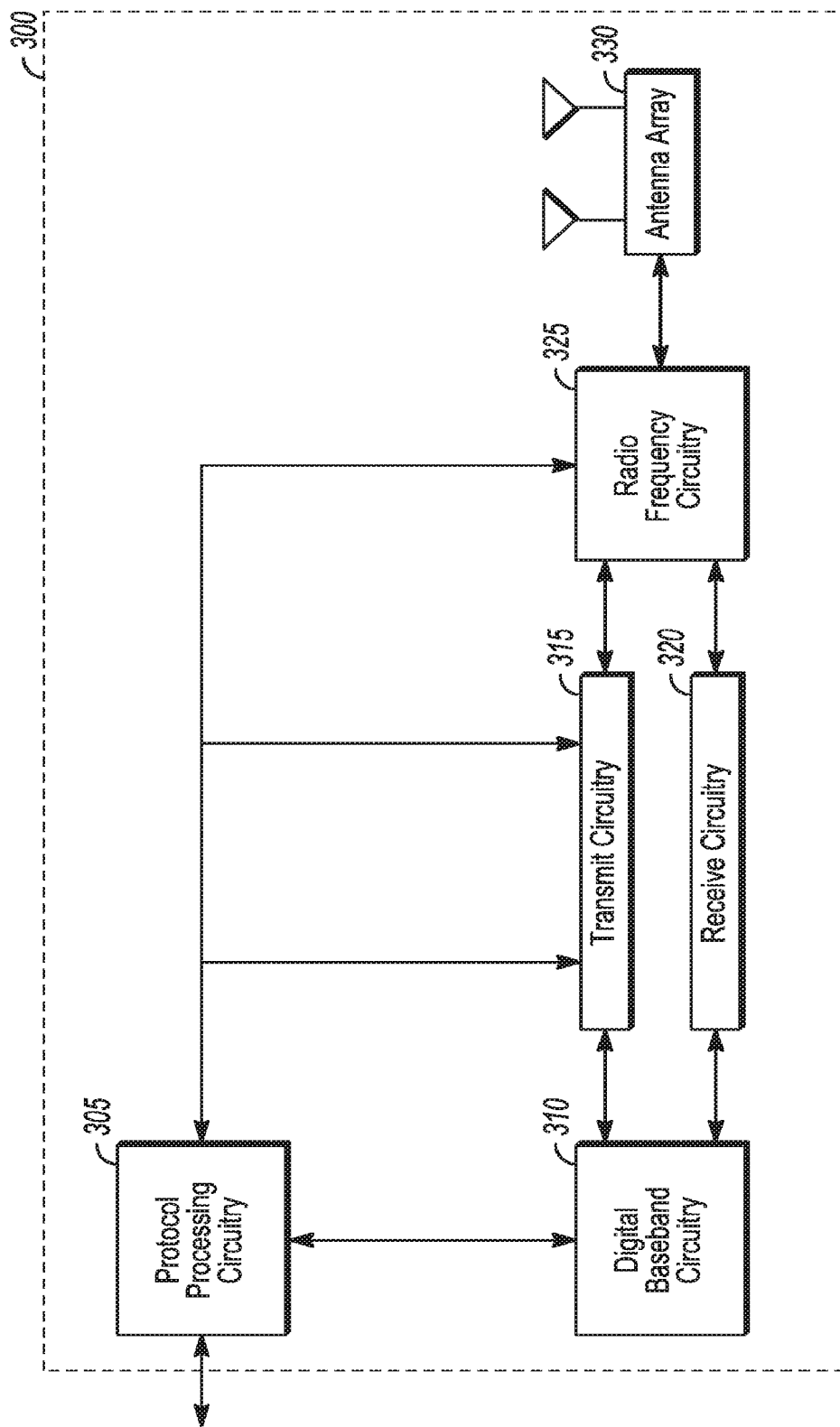
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry. In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect subsystem, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I2C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O) subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface subsystem may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
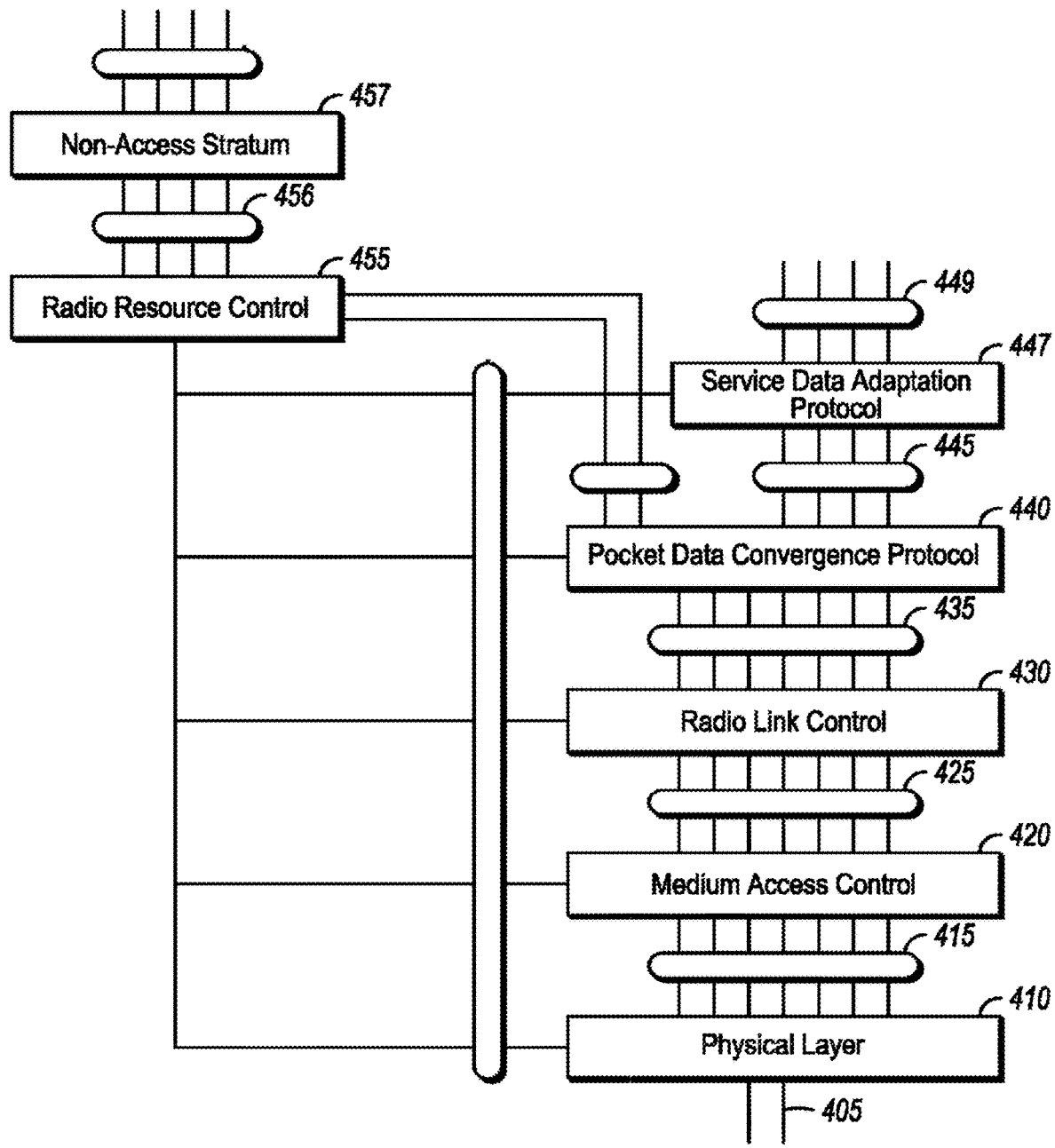
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
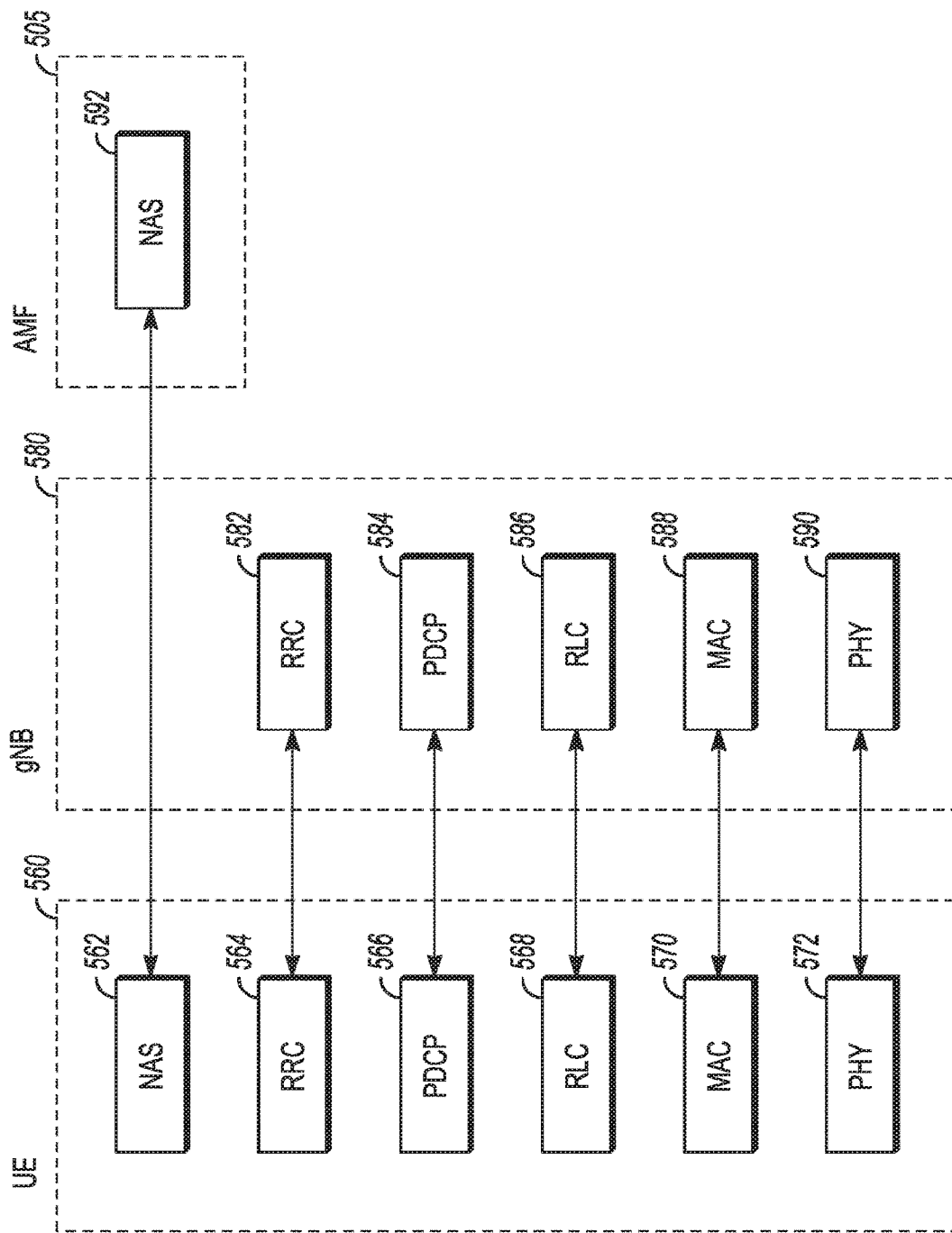
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B(gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, $T_s$ may be defined as $1/(30,720 \times 1000)$ seconds. According to some aspects, a radio frame may be defined as having duration 30,720.$T_s$, and a slot may be defined as having duration 15,360.$T_s$. According to some aspects, $T_s$ may be defined as $$T_s = 1/(\Delta f_{max} \cdot Nf),$$

where $\Delta f_{max} = 480 \times 10^3$ and $Nf = 4,096$. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect. the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i) = d(i)$$

and the layer mapping for two layers may be expressed as:

$$x^{(0)}(i) = d(2i)$$

$$x^{(1)}(i) = d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(1) \ldots x^{(v-1)}(i)]^T$$

where i represents a sequence number index in the range 0 to $M_{symb}^{layer} - 1$ the output is represented as a block of vectors:

$$[z^{(0)}(i) \ldots z^{(P-1)}(i)]^T$$

where i represents a sequence number index in the range 0 to $M_{symb}^{ap} - 1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_r(t - T_{sym}) \exp[j 2\pi f_k (t - T_{sym} - \tau_k)]$$

Where $p_T(t)$ is a prototype filter function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, 1) where k is the index number of subcarrier, in the range 0 to N.M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

Figure 6:
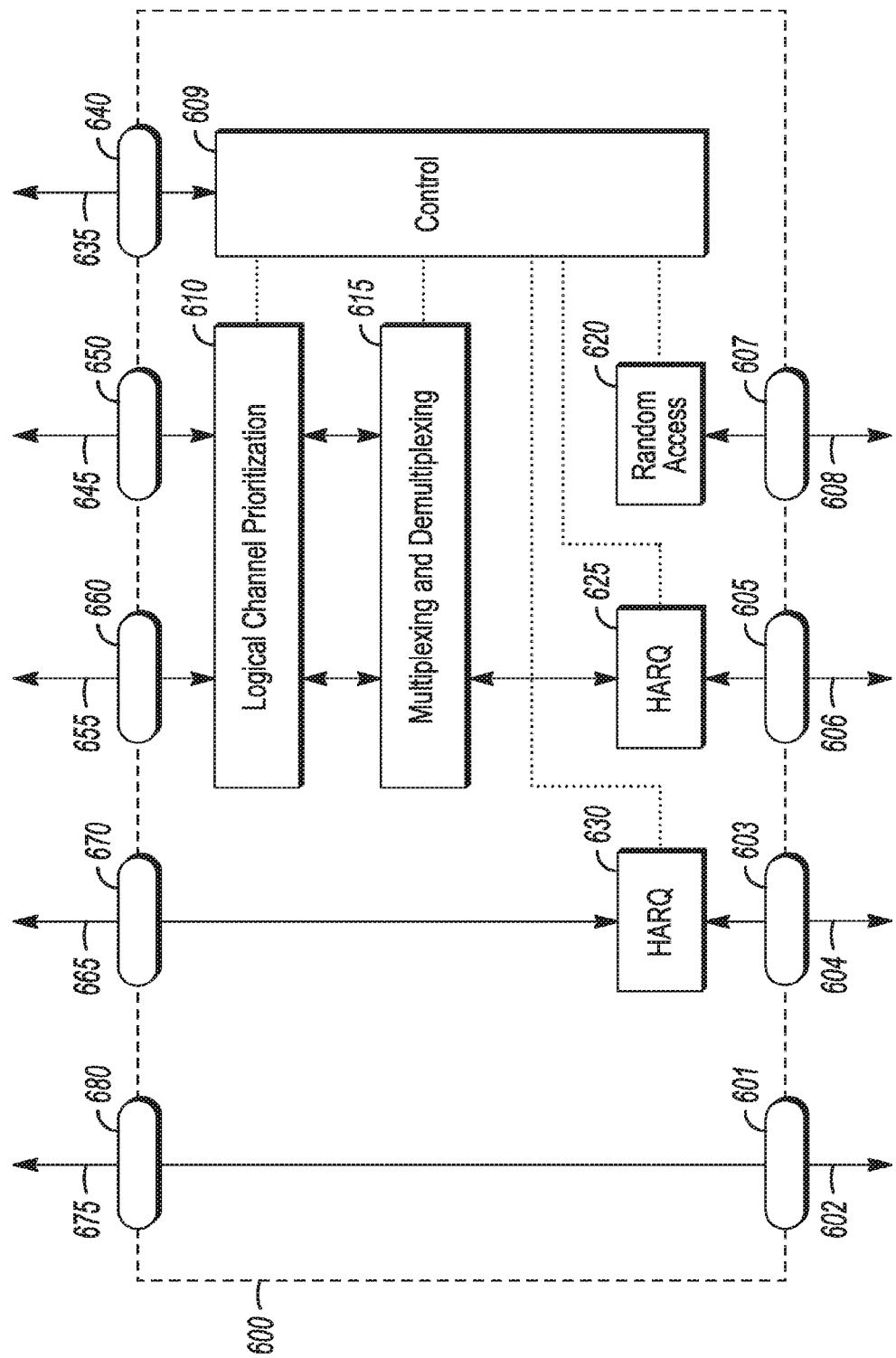
FIG. 6 is an illustration of a Media Access Control (MAC) entity in accordance with some embodiments.

FIG. 6 is an illustration of a Media Access Control (MAC) entity in accordance with some embodiments. According to some aspects, MAC entity 600 may include one or more of a controller 605, a logical channel prioritizing unit 610, a channel multiplexer & de-multiplexer 615, a PDU filter unit 615, random access protocol entity 620, data hybrid automatic repeat request protocol (HARQ) entity 625 and broadcast HARQ entity 630.

According to some aspects, a higher layer may exchange control and status messages 635 with controller 605 via management service access point 640. According to some aspects, MAC service data units (SDU) corresponding to one or more logical channels 645, 655, 665 and 675 may be exchanged with MAC entity 600 via one or more service access points (SAP) 650, 660, 670 and 680. According to some aspects, PHY service data units (SDU) corresponding to one or more transport channels 685, 695, 6105 and 6115 may be exchanged with a physical layer entity via one or more service access points (SAP) 690, 6100, 6110 and 6120.

According to some aspects, logical channel prioritization unit 610 may perform prioritization amongst one or more logical channels 645 and 655, which may include storing parameters and state information corresponding to each of the one or more logical channels, that may be initialized when a logical channel is established. According to some aspects, logical channel prioritization unit 610 may be configured with a set of parameters for each of one or more logical channels 645 and 655, each set including parameters which may include one or more of a prioritized bit rate (PBR) and a bucket size duration (BSD).

According to some aspects, multiplexer & de-multiplexer 615 may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, multiplexer & de-multiplexer 615 may separate one or more MAC-SDUs or partial MAC-SDUs contained in a received MAC PDU, corresponding to one or more logical channels 645 and 655, and may indicate the one or more MAC-SDUs or partial MAC-SDUs to a higher layer via one or more service access points 650 and 660.

According to some aspects, HARQ entity 625 and broadcast HARQ entity 630 may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity 630 may retransmit a same TB in successive transmit intervals a predetermined number of times. According to some aspects, a transmit HARQ process included in a HARQ entity 625 may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 7:
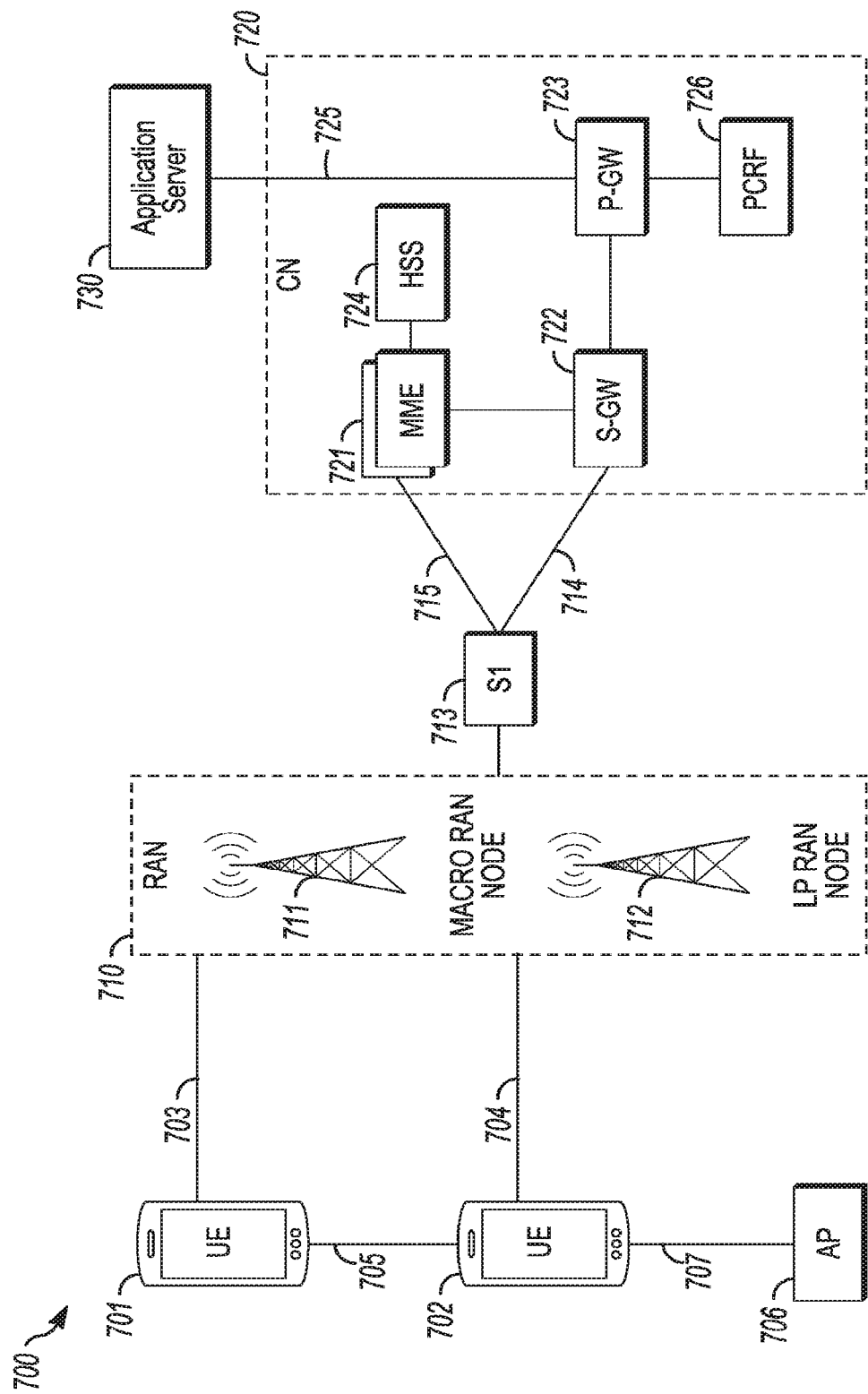
FIG. 7 illustrates an architecture of a system of a network in accordance with some embodiments.

FIG. 7 illustrates an architecture of a system of a network in accordance with some embodiments. The system 700 is shown to include a user equipment (UE) 701 and a UE 702.

The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations. Similarly, a MTC PDCCH (MPDCCH) may be used for eMTC UEs.

The RAN 710 is shown to be communicatively coupled to a core network (CN) 720—via an S1 or NG interface 713. In embodiments, the CN 720 may be an evolved packet core (EPC) network, a 5GC network, or some other type of CN. In this embodiment, the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capability of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN.

The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VOIP) sessions, PTT sessions, group communication sessions, social networking services, etc.) for the UEs 701 and 702 via the CN 720.

The P-GW 723 may further be a node for policy enforcement and charging data collection. Policy and Charging Rules Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

The components of FIG. 7 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 706. Accordingly, the memory of processors, the memory/storage devices, the peripheral devices, and the databases are examples of computer-readable and machine-readable media.

As above, MTC is a promising and emerging technology that may include applications such as smart metering, healthcare monitoring, remote security surveillance, and an intelligent transportation system. These services and applications may stimulate the design and development of a new type of UE whose seamless integration into current and next generation mobile broadband networks such as LTE and LTE-Advanced is desirable.

MTC—and IoT-specific designs are being developed, with the primary objectives focusing on lower device cost, enhanced coverage and reduced power consumption. To further reduce the cost and power consumption, it may be beneficial to further reduce the transmission bandwidth. In Rel-13 NB-IoT, the transmission bandwidth for both control and data channels has been reduced to 1 PRB, and in Rel-13 eMTC, transmission bandwidth for both control and data channels has been reduced to 1.4 MHz. As a further enhancement, the transmission bandwidth of data channels may be increased to 5 MHz for Rel-14 feMTC UEs, which may create additional varied issues in communications.

In both (f) eMTC and NB-IoT systems, time domain repetitions have been adopted as the technique for coverage enhancement. The supported repetitions for PUSCH/NPUSCH may be limited to certain values, i.e., {1, 2, 4, 8, 16, 32, 64, 128, 192, 256, 384, 512, 768, 1024, 1536, 2048} for Physical Uplink Shared Channel (PUSCH) transmissions and {1, 2, 4, 8, 16, 32, 64, 128} for narrowband PUSCH (NPUSCH) transmissions.

Due to the coarse granularity of supported repetition levels (RLs), the actual coverage of the MTC UE may correspond to somewhere in between two aforementioned repetition levels. This may be problematic as scheduling a PUSCH transmission with a higher RL may result in unnecessary UL transmissions and increase UE power consumption, which may be of concern especially for devices with limited battery life and/or in locations that are difficult to access. On the other hand, an initial transmission may be configured with fewer number of repetitions, and additional retransmissions may be scheduled to achieve a target Block Error Rate (BLER) and coverage. However, such a retransmission schedule may prolong the latency of the communications and decay on-time performance.

Moreover, in many cases, the receiver may be able to successfully decode the transmitted transport blocks with fewer number of repeated transmissions for the initial or retransmission than the scheduled number of repetitions. This may occur because the scheduled number of repetitions may be originally intended based on long-term channel conditions or a coverage level for the particular UE for a given physical channel, while the instantaneous channel conditions may be different.

To optimize such scenarios, an early termination signal (ETS) may be applied. The use of the ETS may permit the UE to terminate repeated transmissions of the initial transmission or retransmission before the number of repetitions originally scheduled by the eNB/gNB (referred to below simply as the eNB for convenience). It would be beneficial for UEs to avoid excess number of repetitions and reduce UE power consumption by designing the configuration and applicability, physical design and resource allocation of the ETS.

Figure 8:
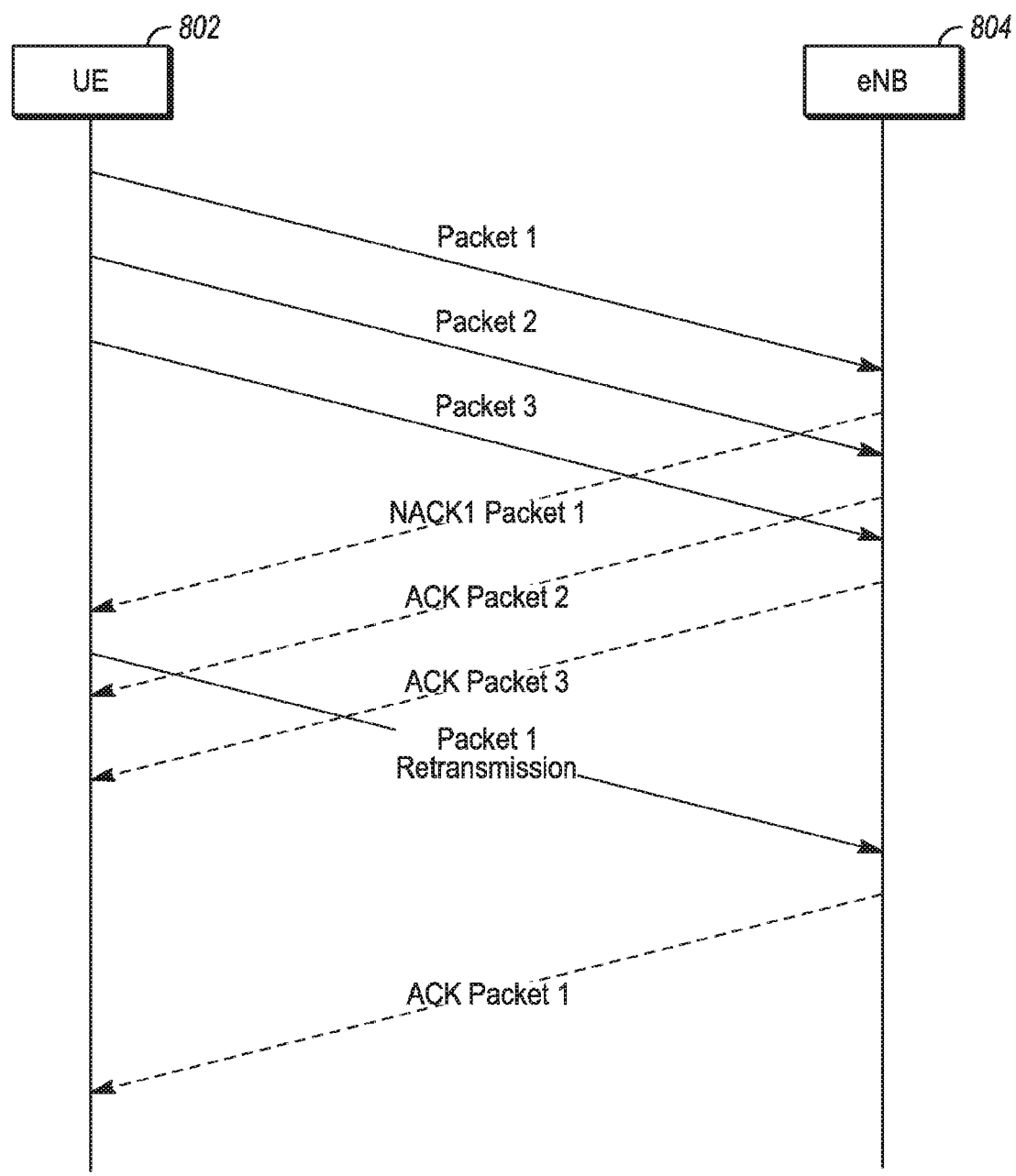
FIG. 8 illustrates a HARQ process in accordance with some embodiments.

FIG. 8 illustrates a HARQ process in accordance with some embodiments. The UE 802 and eNB 804 may be shown in FIGS. 1-7. Although the UE 802 is shown as the transmitter and the eNB 804 the receiver (UL transmission), the same process may be applied for a DL transmission.

In FIG. 8, the UE 802 may transmit several packets. As shown, the eNB 804 responds to the UE 802 with either a successful reception (ACK) or unsuccessful reception (NACK) transmission to indicate whether or not the particular packet was successfully received. The UE 802 may repeat transmission to the eNB 804 of any packets for which a NACK was received, up to a predetermined number of repetitions or an ACK is received from the eNB 804. As multiple packets may be transmitted by the UE 802 prior to HARQ feedback being received, the HARQ feedback may indicate which packet is being responded to.

The HARQ process may be either chase combining, in which the same packet is sent (and stored in a buffer) to build up the signal characteristics, or incremental redundancy, in which a portion of the data in the packet changes. The packet may contain data, error detection bits and Forward Error Correction bits (FEC). The HARQ transmissions may be synchronous, where the receiver has knowledge of the packet to arrive (the HARQ number and RV), or asynchronous, where the transmitter provides details about which HARQ process is being used. The retransmissions may be adaptive, where the transmission attributes may change among the retransmissions but are notified by the transmitter, or non-adaptive in which the transmission characteristics remain the same during each retransmission.

In one embodiment, the UE can signal the capability to support ETS. The UE may transmit ETS support in capability information. The capability information may be provided during RRC connection establishment. In this case, message 3 (contention resolution) in the initial random access (RACH) procedure before RRC establishment may not support ETS. In some embodiments, if the UE has connected to the network (i.e., the RACH procedure is not the initial procedure), the network may have stored the UE capabilities, allowing ETS to be used during the RACH procedure. Message 3 may be addressed towards a TMSI value or Random number but contains a new cell Radio Network Temporary Identifier (C-RNTI) which will be used for further communication between the UE and the eNB.

In one embodiment, ETS is supported only in certain coverage conditions, e.g. deep coverage such as CE mode B. Alternatively, both CE mode A and CE mode B may support ETS. In another embodiment, the supported cases for ETS and the HARQ-ACK feedback for early termination of MTC Physical Downlink Control Channel (MPDCCH) monitoring in case of PUSCH transmissions confirming the reception of the RRC Connection Release message can be different. For example, in one embodiment only CE mode B may support ETS, while both CE mode A and CE mode B can support HARQ-ACK feedback for early termination of MPDCCH monitoring for PUSCH transmissions confirming the reception of the RRC Connection Release message. Alternatively, both ETS and the HARQ-ACK feedback for early termination of MPDCCH monitoring for PUSCH transmissions confirming the reception of the RRC Connection Release message may be supported.

The eNB may enable the ETS semi-statically via higher layer signaling. In some embodiments, the configuration can be cell-specific. Alternatively, the configuration may be UE-specific.

In one embodiment, ETS may be used, when enabled, only when the number of scheduled PUSCH repetitions is larger than a predetermined amount R, where R can be a positive integer such as R=32, 64, 128, 256 or 512. In other words, if the number of repetitions scheduled for the PUSCH is no more than R, the UE will not expect the use of ETS. R may vary dependent on the bandwidth used by the UE, channel conditions, or other variables.

In another embodiment, ETS may be configured to be enabled for PUSCH retransmission by higher layer signaling. In one example, ETS may be used for retransmission only when the number of scheduled repetitions for the retransmission is larger than a predetermined amount R1, where R1 can be a positive integer and can be different from R in the above embodiment. For example, R1 can be 32, 64, 128 or 256, which can be smaller than R. A mapping from R to R1 can be predefined or configured, e.g. R1=a*R, where a can be any real number less than 1, such as 0.5.

In another embodiment, upon reception of ETS, the UE may stop monitoring the control channel or enters light sleep mode until the subframe in which the last repetition of PUSCH was originally scheduled. Alternatively, the UE may keep monitoring the search space as configured after reception of the ETS. In this case, the eNB can schedule a PDSCH/PUSCH transmission after the termination of PUSCH transmission before the last repetition of the PUSCH transmission originally scheduled.

The ETS physical design may take various embodiments. These embodiments may include ETS physical designs that are MPDCCH-based, Physical Hybrid-ARQ Indicator Channel (PHICH)-based, and/or sequence-based When the ETS is based on the MPDCCH, in one embodiment, the ETS can be based on existing downlink control information (DCI) formats, e.g. DCI format 6-0A or DCI format 6-0B. In this case, a mechanism may be used that is similar to semi-persistent scheduling (SPS) validation. Specifically, one or more fields in the DCI can be set to predefined default values for validation of the reception of the ETS. These fields may include the cyclic redundancy code (CRC), which may be scrambled using the C-RNTI or alternatively, a group-RNTI can be defined and used. DCI format 6-0A may include a Transmit Power Control (TPC) field set to '00' (DCI format 6-0B does not include a TPC field). The resource block assignment field may be set to all '1's. The redundancy version (RV) field may be set to '00.' The Modulation and Coding Scheme (MCS) field may be set to all '1's. The Channel State Information (CSI) request field, if present, may be set to '0'. The repetition number (for PUSCH) field may be set to all '0's. The New Data Indicator (NDI) field, which indicates whether the transmission is a new transmission or retransmission, may be set to '0'. The frequency hopping flag field, if present, may be set to '0'. Note that in various embodiments, some of the above fields may be used as validation bits and different default values may be used. Note further that the default values above are merely examples—other values may be used in other embodiments.

In one embodiment, the MPDCCH payloads are the same for the explicit HARQ-ACK for termination of MPDCCH monitoring and for the explicit HARQ-ACK for termination of a PUSCH transmission. The UE may be able to determine whether the UE is to go to sleep based on the contents of latest (may be the on-going) PUSCH transmission. For example, if the latest PUSCH transmission is for confirming the reception of an RRC Connection Release message, once the UE receives the explicit ACK feedback for the PUSCH transmission, the UE may be able to enter sleep mode.

Alternatively, the MPDCCH payload of the explicit HARQ-ACK for termination of MPDCCH monitoring and for termination of a PUSCH transmission can be different. This may be determined by the UE through the use of different default values for certain fields. In one example, different payloads in the HARQ-ACK feedback for a DRX command and for other use cases, such as termination of a PUSCH transmission and termination of MPDCCH monitoring before the RRC release message. As one example of such a design, for CE mode A, the least significant bit (LSB) 5 bits in the resource block assignment field can be set to all '1's to indicate the termination of MPDCCH monitoring and can be set to '11110' to indicate the termination of a PUSCH transmission, or vice versa. As another example, for CE mode B, the 4-bit MCS field can be set to all '1's to indicate the termination of MPDCCH monitoring and can be set to '1110' to indicate the termination of a PUSCH transmission, or vice versa. Note that the use of other default values in addition or instead of the above are not precluded.

In one embodiment, the HARQ process number field can be reused to indicate to which HARQ process the ETS is related. Alternatively, the HARQ process number field plus additional bits (which may be reused from other fields and the number of validation bits reduced) can be used as a bitmap for all HARQ processes. For example, in CE mode A, 8 bits can be used to indicate which PUSCH TB has been successfully received, while in CE mode B, 2 bits can be enough as there are only 2 HARQ processes supported in CE mode B.

In another embodiment, the ACK/NACK information can be jointly encoded with another field in the DCI. In an example, the ACK/NACK information may be jointly encoded with the HARQ process number. The MSB or LSB of HARQ process number field, or alternatively other fields, can be used to indicate the ACK/NACK of an on-going PUSCH transmission or the latest PUSCH transmission if there is no on-going PUSCH transmission.

Instead of using an existing DCI, in some embodiments, a new DCI format can be defined for ETS. The DCI can be a more compact DCI than the existing DCIs (e.g., DCI format 6-0A or 6-0B) to reduce the number of repetitions needed to achieve certain coverage. For example, the size of the new DCI may be 2 bits (plus the CRC bits), if ETS is supported only in CE mode B. More generally, the size of the new DCI may be N bits plus M CRC bits. The N bits can be used for indication of an ACK/NACK for N HARQ processes, or can be used to indicate a HARQ-ACK response for a HARQ process and/or the repetitions numbers after this ETS to be transmitted by the UE. The field of the number of repetitions can be ignored if the indication of the HARQ-ACK feedback is ACK.

In one embodiment, a 16-bit CRC can be used. Alternatively, the number of CRC bits can be reduced, e.g. to 8 bits. In this case, 8 out of 16 bits in the C-RNTI can be used to scramble the CRC. Alternatively, a group-RNTI can be defined to enable the eNB to respond to a several UEs at the same time. In this case, the eNB should ensure there is no confusion among the UEs, i.e. feedback is supplied on different resources for UEs with the same 8 bits from the C-RNTIs. Moreover, as this is a new DCI format, the UE may increase blind detections to decode the DCI.

In one embodiment, the UE may monitor both the existing MPDCCH transmission and the new DCI format. This may result an increase in the UE complexity. However, as the new DCI may be limited, for example, with 2 bits in the new DCI as the bitmap for HARQ-ACK feedback, the UE may have a priori knowledge that the DCI content may consist of only 4 possible states. Thus, the UE may merely perform a correlation-based detection procedure, with 4 hypothesis tests, for the new DCI detection. This complexity is quite low compared to regular DCI decoding.

In some embodiments, ETS may be used only when the HARQ-ACK response is an ACK. In such embodiments, 1 bit can be used to indicate one out of two HARQ processes that has been successfully received, or 2 bits can be used to indicate which of two processes have been successfully received. As another example, N bits can be used as validation bits. These bits may be used in additional to the CRC bits. In this case, the presence of the ETS may indicate the ACK of an ongoing PUSCH transmission. In this embodiment, if a UL grant indicates a new transmission of a HARQ process that is same as the ongoing PUSCH transmission, the eNB may not send the ETS. The eNB may instead merely send a UL grant. Once the UE receives the UL grant, the UE may consider the UL grant as the termination of the ongoing PUSCH transmission and instead start a new transmission based on the new UL grant.

In another embodiment, the UE may avoid simultaneously monitoring the existing DCI formats and the new DCI format. Thus, the UE may not be expected to monitor for DCI formats scheduling PDSCH or PUSCH transmissions (e.g., DCI formats 6-1B/0B) in the subframes when the UE is expected to monitor for the ETS. In this case, the UE complexity is kept low at the cost of limiting the scheduling flexibility. Further, in this case, the MPDCCH search space and the DL narrowband (NB) monitored for the ETS may be different from the DL NB monitored for UE-specific shared space (USS) monitoring.

Different monitoring embodiments may be used for half-duplex FDD (HD-FDD) UEs. In some embodiments, the existing UL gaps may be reused, the existing gaps may be lengthened, or additional UL gaps may be created. During these gaps, the UE may only be expected to monitor for the ETS and not for DCI formats 6-1B/0B. In one example, the search space of the ETS can be overlapped with one or more other USS and/or common search space (CSS). The priority regarding which search space to be monitored by the UE can be predefined or configured by the eNB, e.g. via RRC signaling.

In one example of priority, the entire search space with lower priority that overlaps with a search space with higher priority may be dropped. Alternatively, only the MPDCCH candidates in the lower priority search space which occupies a part of the search space with higher priority may be dropped. For example, in cases where the monitoring of the ETS has higher priority than other USS/CSS, the UE can still monitor the MPDCCH transmitted on the USS/CSS that overlaps with search space for ETS by skipping the MPDCCH candidates that overlap with the ETS search space. Given that the repetitions for ETS can be quite small if a compact DCI is used for the ETS, the search space for the ETS can be configured with relatively small occasions and thus may result in limited impact in scheduling flexibility.

As another example, the search space with lower priority may be deferred on the subframes configured for monitoring of the search space with higher priority. For example, in cases where the monitoring of the ETS has higher priority than other USS/CSS, the MPDCCH candidates that overlap with the ETS search space can be deferred after the ETS search space. To allow this, the parameter G configured for USS/CSS can also be set to a larger value that takes into account the impact from the ETS search space.

As another example, certain candidates in the USS/CSS can be skipped if the USS/CSS overlaps with the ETS search space. For example, the blind detection trials for the ETS can be reduced, e.g. by selecting certain combinations, e.g. only N PRBs with a subset of $\{R_{ETS}, R_{ETS}/2, R_{ETS}/4, R_{ETS}/8\}$. To keep the same blind detection attempts at each time instance, the blind detection attempts for other USS/CSS can be limited to a subset of original blind detection attempts, and these candidates can still be blindly detected on the ETS monitoring occasions, as long as the total number of blind detections can be kept the same. For example, ETS blind detection attempts can be defined as $\{24, R, 1\}$, where R can be $\{R_{ETS}, R_{ETS}/2, R_{ETS}/4, R_{ETS}/8\}$. Then candidates in other USS/CSS can be [{2,R1,1} {4,R1,1}], [{4,R2,1} {8,R2,1}], [{8,R1,2} {16,R1,1}], [{8,R2,2} {16,R2,1}], [{8,R3,1} {16,R3,1}], where R1, R2, R3 and R4 depends on Rmax of the search space. Other combination of blind detection trials for ETS and other USS/CSS are not precluded.

The MPDCCH search space used to carry the DCI can be configured similar to the Type1-CSS for MPDCCH with an assumption that the aggregation level (AL)=24 (MPDCCH format 5) to minimize the number of time-domain repetitions of the MPDCCH used. For example, the UE can assume that all the 6 PRBs in the NB with distributed transmission is always used for ETS.

In the various embodiments above, the ETS can be UE-specific if a C-RNTI is used. In another embodiment, the ETS can be group-specific if a group-RNTI is introduced. In addition, the ETS in some embodiments may be transmitted only when the ETS is an ACK. Alternatively, the ETS can be always transmitted (regardless of ACK or NACK), and the information carried by the ETS would indicate whether the transmission is an ACK or NACK. Similar embodiments may be used for feNB-IoT UEs; 1 bit or just the CRC may be sufficient for UEs configured with 1 HARQ process. On the other hand, for UEs configured with 2 HARQ processes, 2 bits can be used-similar to the CE mode B in the efeMTC design.

Figure 9:
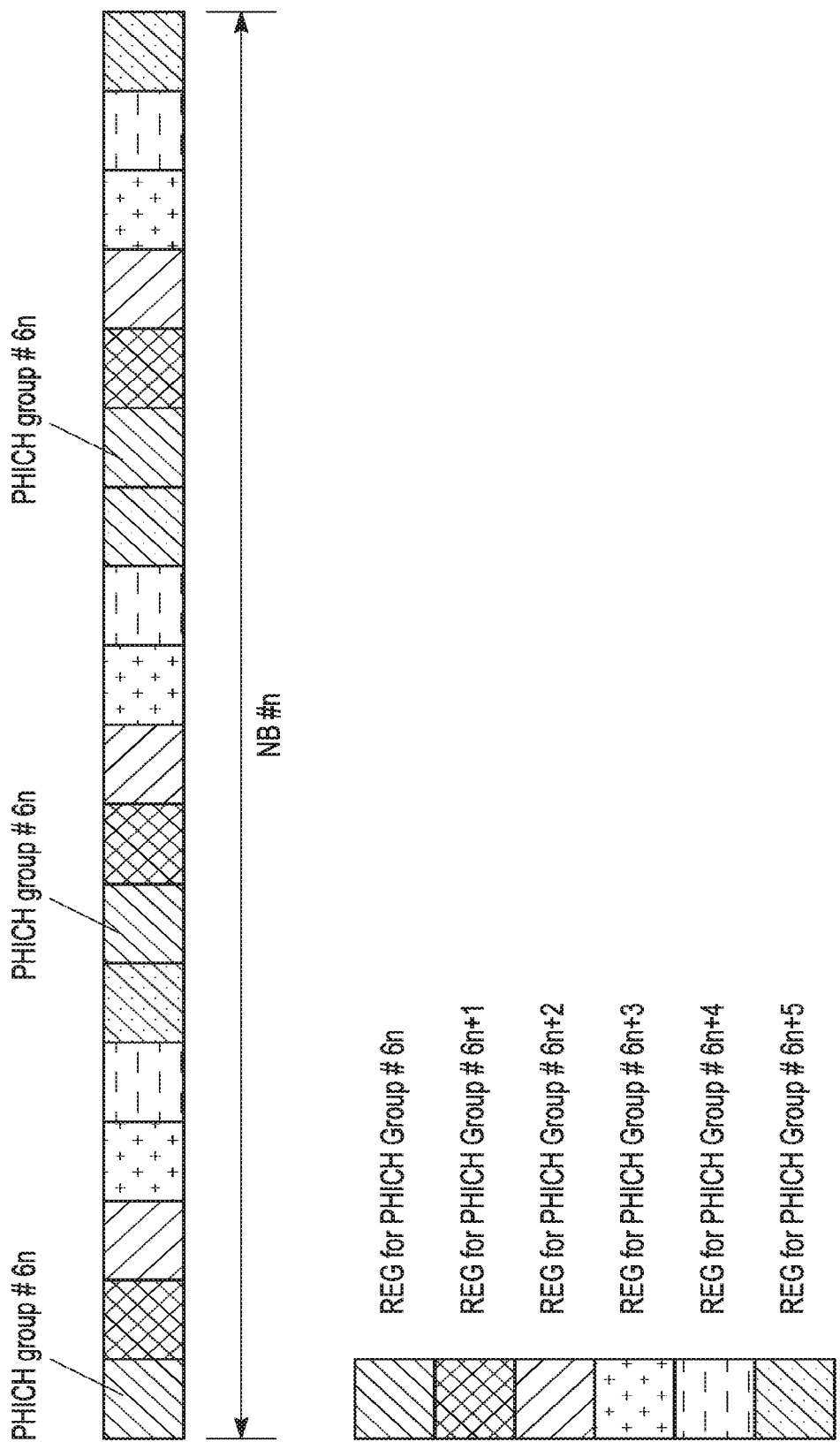
FIG. 9 illustrates a bandwidth limited Physical Hybrid-ARQ Indicator Channel (PHICH) in accordance with some embodiments.

When the ETS is based on the PHICH, the PHICH can be reused and/or extended for the ETS. Recall that the PHICH is spread across the whole system BW in legacy LTE. For BL UEs, a bandwidth-limited PHICH with coverage enhancement may be used. FIG. 9 illustrates a bandwidth limited Physical Hybrid-ARQ Indicator Channel (PHICH) in accordance with some embodiments.

For the design of the bandwidth-limited PHICH, the PHICH group 900 can be mapped to each NB as illustrated in FIG. 9. In the embodiment of FIG. 9, 1 REG may consist of 4 resource elements (REs). Note that when the PHICH is transmitted on the symbols carrying the cell reference signal, primary synchronization signal, or secondary synchronization signal (CRS/PSS/SSS), the PHICH can be punctured on, or rate matched around, the REs.

Various methods can be used to achieve coverage enhancement. In one embodiment, the PHICH may be power boosted (e.g., by increasing the number of REs used).

In another embodiment to achieve coverage enhancement, frequency domain enhancement may be used. A new virtual PHICH group, corresponding to multiple PHICH groups in existing LTE can be defined. The REs allocated for these existing multiple PHICH groups can be used for the new introduced PHICH group. For example, the PHICH groups #6n and #6n+3 shown in FIG. 9 can be allocated together for one PHICH transmission. In this case, a new rate matching, mapping the PHICH symbols to the increased REs can be used. The PHICH transmission can be repeated, with each repetition mapped to one existing PHICH group. The PHICH can also be spread with a longer sequence to be mapped to increased REs. The longer sequence can still be based on the demodulation reference signal (DMRS) sequence. In this example, more cyclic shifts may be supported to multiplex more UEs.

Alternatively, or in addition, time domain repetition may be used. In one embodiment, the PHICH transmission may be transmitted in only one symbol in a subframe, and can be repeated across subframes. The PDSCH transmission can be rate matched around this symbol, or may be punctured. In one embodiment, the PHICH transmission may be repeated in multiple symbols within a subframe. For example, the PHICH transmission can be transmitted on the last 11 symbols within a subframe, where the first 3 symbols are not used for coexistence with legacy control region. On top of this, additional repetitions across subframes can be used for further coverage enhancement.

Note that for feNB-IoT, the PHICH transmission within 1 PRB can be designed. For example, only 1 PHICH group occupying the PRB may be introduced. In this case, frequency domain enhancement may not be supported, while power boosting and time domain repetitions can still be applied. Orthogonal sequences can be applied to the PHICH transmission to enable UE multiplexing. For example, following LTE, up to 8 orthogonal sequence can be applied to one PHICH group in one OFDM symbol. In additional, with PHICH repetitions, a time domain orthogonal cover code (OCC) such as a Hadamard code or DFT code can be used as well for PHICH multiplexing. For example, with 11 symbols in a subframe for the PHICH repetitions, a length-11 OCC can be used to multiplex up to 8*11 PHICHs. The orthogonal sequence and time domain OCC to be used can be configured by the eNB, e.g. via RRC signaling. Alternatively, a mapping from UE/PUSCH to the associated PHICH can be defined, which is elaborated below.

In other embodiments, rather than being based on the MPDCCH or PHICH, the ETS may be sequence-based. In such embodiments, the sequence can be any constant amplitude zero autocorrelation (CAZAC) sequence, e.g., a Zadoff-Chu (ZC) sequence. For example, narrowband PSS/SSS (NPSS/NSSS), PSS or DMRS sequences can be used. To differentiate from legacy NPSS/NSSS/PSS sequences, a ZC sequence with a root index different from existing root indexes used for NPSS/NSSS/PSS may be used. If a DMRS sequence is used, the DMRS root index and CS/OCC can be based on the cell ID and/or UE ID.

Turning to ETS resource allocation, both time-domain and frequency-domain resource allocation are described below. Time-domain resources may include monitoring instances for the ETS. In some embodiments, the monitoring instances may be configured to be periodic, possibly with an offset. The periodicity and/or offset can be predefined, or configured via RRC signaling, similar to the search space starting subframe configuration for existing USS. The value of periodicity and/or offset can be cell-specific or UE-specific. In some examples, a time window may be applied on top of a periodic ETS transmission, where the ETS is transmitted only within the window. The window can be configured (e.g., via RRC signaling) or predefined, and the value can depend on the repetition level (RL) of the PUSCH transmission.

In one embodiment, a specific timing relationship may exist between the first PUSCH subframe and the corresponding ETS. Specifically, the first ETS for a certain PUSCH can be transmitted X subframes after the start of the PUSCH transmission. The following ETS transmission opportunity can be between every P PUSCH transmission subframes after X ms from the start of the PUSCH transmission, where P is the configured periodicity of ETS monitoring occasions. Alternatively, the ETS monitoring occasion can be X+nP, taking into account the switching subframes (for a HD-FDD UE) and ETS durations, i.e. ETS monitoring occasion can be between every (P−2-ETS duration) PUSCH subframes for HD-FDD transmission. In another example, the ETS monitoring occasion is defined as every P ms (e.g., P may be specified as 256) of UL transmissions (which may include non-BL/CE UL subframes). In one example, the ETS duration can be the number of repetitions used for a single ETS transmission. In another example, the ETS duration can be larger, e.g. to incorporate multiple ETS transmissions to provide flexibility at the eNB side. The ETS duration can be predefined or configured by RRC signaling. For example, the ETS duration can be the same as the UL compensation gap, i.e., 40 ms.

The X, P, and/or maximum value of n can depend on the coverage level of the UE, e.g. depending on the number of PUSCH repetitions, or PRACH coverage level, or Rmax in USS. The X, P, and/or maximum value of n can be predefined or configured by RRC signaling. In one example, n can be $\{0, 1, \ldots, \text{ceil}((R-X+Y)/P)\}$, where R is the smallest supported number of PUSCH repetitions used for the UE to achieve a target Maximum Coupling Loss (MCL) at a target Block Error Rate (BLER) with initial transmission. For example, if the eNB always schedules the PUSCH transmission with a large enough number of repetitions to achieve the target MCL at the target BLER with initial transmission, then R is the number of repetitions indicated by the UL grant for the initial transmission scheduling. In one example, when X is larger than the number of scheduled PUSCH repetitions, this may imply that ETS is not used for this PUSCH transmission.

Y can be a predefined parameter or may be dependent on the UE coverage level, e.g. a function of number of PUSCH repetitions or Rmax. Y can be configured by RRC signaling. As one example, Y can be set to no more than the drx-ULRetransmissionTimer if cDRX is configured. This may be useful for use by a PUSCH transmission to confirm the reception of RRC connection release message. In this example, the ETS monitoring occasions may occur at every P PUSCH transmission subframe starting from X ms after the start of the PUSCH transmission, and ending by Y ms after the end of the PUSCH transmission. Note that as long as a UE receives an ACK from the eNB, the remaining ETS monitoring occasions may be skipped by the UE.

For example, if the smallest supported number of PUSCH repetitions used by the UE is R (e.g. if the UE uses between 512 and 1024 repetitions, R would be 1024), then X and P can be R/f, and n can be from $\{0, 1, \ldots, f-1$ or ceil $((R-X+Y)/P)\}$, where f is a positive integer, which can be predefined or configured by the eNB, e.g. via RRC signaling. The parameter Y may limit the transmission opportunity of the HARQ-ACK feedback signal after the end of the PUSCH transmission, e.g. Y can be m*P with m being an integer (e.g. m=2, 3, or 4). As another example, X and P can be R/4, and n can be from $\{0, 1, \ldots, 5\}$. To further reduce the ETS monitoring occasions, in this example, X can be R/2 and P can be R/4. Alternatively, X can be the largest number of repetitions that is smaller than the number of repetitions to be used for the PUSCH transmission (denoted by R). For example, if R=1024, then X can be 512.

Figure 10:
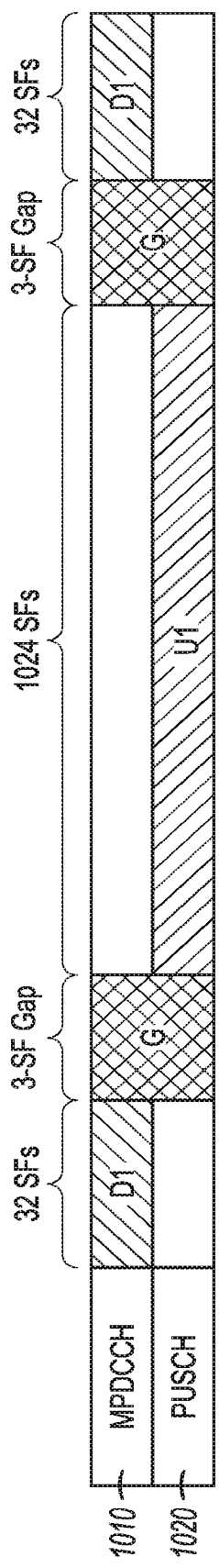
FIG. 10 illustrates a Physical Uplink Shared Channel (PUSCH) transmission without an early termination signal (ETS) in accordance with some embodiments.
Figure 11:
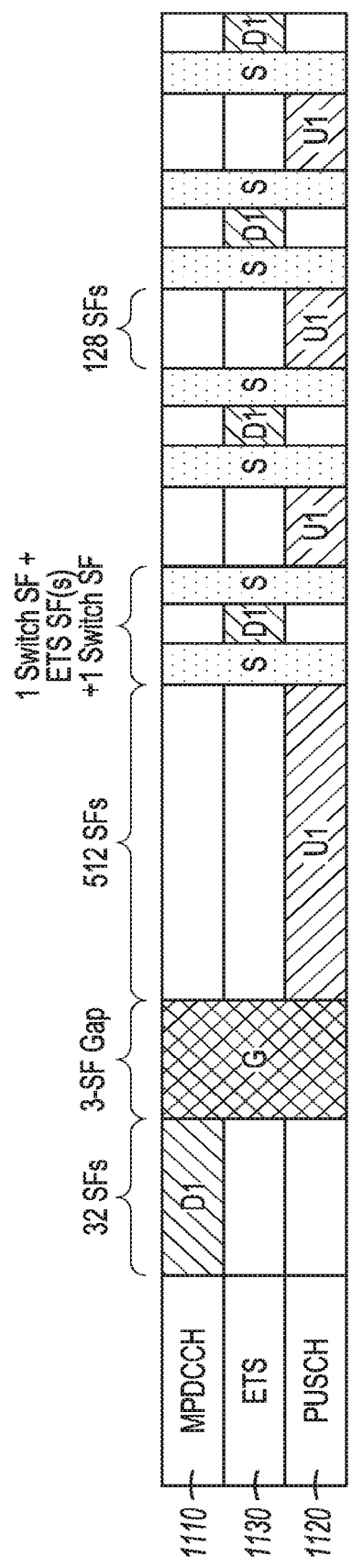
FIG. 11 illustrates a PUSCH transmission with an ETS in accordance with some embodiments.

FIGS. 10 and 11 illustrate a PUSCH transmission without and with, respectively, an ETS in accordance with some embodiments. The PUSCH transmission in FIGS. 10 and 11 may assume R is 1024. For example, if the number of repetitions desired is between 512 and 1024, say 896, the DCI may schedule 1024 repetitions. As shown in FIG. 10, the MPDCCH transmission 1010 may indicate the DCI in 24 subframes. There may be a 3 subframe gap between the MPDCCH transmission 1010 and the PUSCH 1020 for TDD or HD-FDD UEs. The PUSCH transmission 1020 may be 1024 subframes long.

After the PUSCH transmission 1020, another 3 subframe gap may be provided prior to the next MPDCCH 1010.

In FIG. 11, if the number of repetitions desired is again between 512 and 1024, say 896, the X can be 512 and P can be 128 PUSCH transmitting subframes or 128+2+ETS duration (if the PUSCH transmission, switching subframes and ETS subframes are taken into account). The signals in FIG. 11 may be similar to those of FIG. 10. The MPDCCH transmission 1110 be 24 subframes and may be followed by a 3 subframe gap. The initial PUSCH transmission 1120 may, however, only be 512 subframes long before monitoring for an ETS 1130. The UE may switch to the subcarriers on which the ETS 1130 is carried, monitor these subcarriers for one or more subframes, and then switch back to transmit the PUSCH transmission 1120 if no ETS is found or if the ETS indicates a NACK. The switching may take one or more subframes. The UE may then transmit further repetitions of the PUSCH transmission 1120 for a shorter number of subframes (shown in FIG. 11 as 128 subframes) than the initial set of PUSCH transmissions before again checking the ETS 1130. This may be repeated until an ETS is received or the PUSCH transmissions reach the predetermined number. The number of subframes after the initial set of PUSCH transmissions may be constant, as shown, or may vary—for example getting smaller with an increase in total number of PUSCH transmissions or with channel conditions.

Note that the ETS should be correctly associated with a corresponding PUSCH transmission. This can be achieved by using a specific timing relationship associated with each PUSCH transmission, which may provide an implicit indication of the HARQ process ID with which the ETS is associated. Thus, in the embodiment, the ETS does not include an explicit indication of HARQ process ID, e.g. a PHICH-like ETS. In this case, the eNB may ensure that no collisions are present on the ETS transmissions for different UEs. If a legacy PHICH orthogonal sequence is reused, there are up to 8 orthogonal sequences per PHICH group. In 1 NB, if each ETS uses only 1 PHICH group, there are up to 8*6=48 ETSs. This may be sufficient to avoid UE collisions. If time domain OCC is used in addition to the 8 orthogonal sequences for PHICH, more ETSs can be supported.

In one embodiment, no specific timing relationship between starting of the PUSCH transmission and the corresponding ETS transmission opportunities exists. In this case, a HARQ process ID may be explicitly indicated. This is to say that an ETS may be transmitted that is based on MPDCCH with HARQ process ID or bitmap for all HARQ processes can be used.

In one embodiment, for an ETS that is based on a MPDCCH transmission, the constraints on the starting subframe of the search space may still apply to the ETS. In this case, the periodic transmission above can be extended to a "pseudo periodic" behavior, where within each periodicity, the ETS may start on the next available starting subframe of the search space. If repetitions across subframes are used for the ETS, the repetitions can be semi-statically configured by higher layer signaling. In another embodiment, the repetitions can be determined based on the coverage level (e.g., PRACH coverage level, PUSCH RLs, Rmax for the MPDCCH, or the number of DCI repetitions used to carry the UL grant) of the UE. For example, a predefined mapping from the PRACH coverage level to ETS RLs can be used, e.g., the PRACH coverage level $\{0, 1, 2, 3\}$ can be mapped to ETS RLs $\{R_{max\_ETS}/4, R_{max\_ETS}/2, R_{max\_ETS}/4*3, R_{max\_ETS}\}$, respectively, where $R_{max\_ETS}$ can be the same as Rmax for other existing MPDCCH, or a predefined value, or indicated via higher layer signaling. Alternatively, if a DCI based ETS is used, the search space candidates can reuse the same design for MPDCCH in Rel-13 eMTC, where the search space candidates are based on $R_{max\_ETS}$ and the aggregation level for the DCI based ETS. Note that the configured periodicity should be large enough to allow repetitions to fit into one periodicity.

Accordingly, the introduction of the ETS may have a timing impact for HD-FDD as gaps for reception of the ETS may be provided between the PUSCH repetitions. However, for full duplex FDD (FD-FDD), no impact may result from the introduction of the ETS.

In one embodiment, the gap can be indicated by eNB via bitmap, e.g. marked as invalid UL subframes. In another embodiment, the gap may be based on the ETS configuration. For example, the duration that starts from 1 subframe before an ETS transmission opportunity and ends at 1 subframe after the ETS transmission opportunity may be the gap where no UL transmission is allowed. In another embodiment, as mentioned above, the ETS may be monitored during the UL compensation gaps that may be configured for more than 256 ms of UL transmissions when the UE is in CE mode B.

For an MPDCCH-based ETS, in one embodiment, the UE may monitor both the ETS and one or more other MPDCCH transmissions simultaneously. In this case, the ETS can be transmitted in the same search space as the configured USS, where ETS monitoring occasions can be further restricted as discussed above with predetermined periodicity, offset and/or within a window.

Alternatively, a separate search space can be defined for the ETS. In one embodiment, the UE may not simultaneously monitor the ETS and another USS/CSS. Specifically, during the ETS monitoring occasions, the UE may not monitor other search spaces. Alternatively, the UE can monitor other search spaces, with reduced blind decoding attempts for a MPDCCH transmission transmitted in the other search spaces. The search space for the ETS can be defined in terms of periodicity, offset, window length during which the ETS may be transmitted, and/or the starting/ending time of the search space with respect to e.g. the starting/ending position of the PUSCH transmission.

As yet another alternative, a single or small number of candidate(s) can be defined in a separate UE-specific or common search space or shared within the USS that the UE is expected to monitor according to the configuration of monitoring occasions. This can limit the impact from increased blind decoding attempts by only increasing the number of total blind decoding candidates by only one or few additional blind decoding candidate(s).

An additional HARQ-ACK feedback monitoring occasion may be added to further support the ETS together with the HARQ-ACK feedback for early termination of MPDCCH monitoring for PUSCH transmissions confirming the reception of a RRC Connection Release message. The additional HARQ-ACK feedback monitoring occasion can be configured after the end of scheduled PUSCH repetitions, e.g. in terms of offset with respect to the end of scheduled PUSCH repetition and a window length for the monitoring occasion duration. The offset and window length can be predefined (e.g. specified in the spec) or may be configured by RRC signaling (e.g. as a part of ETS configuration, or as a separate configuration).

In addition to the time domain resources, frequency domain resources may be considered. In one embodiment, the frequency domain resource may be indicated by the eNB semi-statically. For example, an NB index may be indicated in the RRC configuration for the ETS. In another embodiment, the frequency domain resource may be the same as the NB where the UE monitors for a MPDCCH transmission. As another embodiment, the frequency resource can be the same as the corresponding PUSCH transmission (e.g. in TDD systems).

The detailed resource allocation within a NB can be determined by a variety of methods, which may differ dependent on the ETS design. For example, for a MPDCCH-based design, in one embodiment, all 6 PRBs may be allocated by default for the ETS. In another embodiment, N (less than 6) PRBs may be allocated for the ETS. The number of PRBs allocated for the ETS can be predefined/configured by the eNB and/or can be based on the coverage level (e.g., based on the PRACH coverage level, PUSCH RLs or Rmax for MPDCCH) of the UE. For example, the number of PRBs for PRACH coverage level $\{0, 1, 2, 3\}$ can be predefined to $\{1, 3, 4, 6\}$, respectively. If fewer than all of the PRBs are used, the set of PRBs allocated for the ETS can be predefined to the lowest N PRBs or the highest N PRBs. Alternatively, the eNB may signal the PRB indexes (to be used) or, for example, indicate if the PRBs to be used are the lowest or highest N PRBs. As another example, a mapping from PUSCH resource to the PRB indexes can be defined, as elaborated below.

For a PHICH-based design, in one embodiment, only 1 PHICH group corresponding to 12 REs may be used for the ETS. The group index can be indicated by the eNB, e.g. via RRC signaling. Alternatively, a mapping from the PUSCH PRBs to the PHICH group can be defined. As another example, the PHICH group index can also depend on the UE ID, e.g. determined by mod (C-RNTI+PUSCH resource index, number of PHICH groups).

In one embodiment, multiple PHICH groups can be used for the ETS. The number of PHICH groups, denoted by N, can be indicated by the eNB, e.g. via RRC signaling. Alternatively, the number of PHICH groups can be based on coverage level (e.g. PRACH coverage level, RLs of PUSCH, or Rmax for MPDCCH) of the UE. For example, the number of PHICH groups for PRACH coverage level $\{0, 1, 2, 3\}$ can be predefined to $\{1, 3, 4, 6\}$, respectively.

Various methods can be used to indicate which set of PHICH groups is to be allocated for the ETS. In one embodiment, the set of PHICH groups can be predefined to the lowest or highest N PHICH groups. Alternatively, the eNB may signal the PHICH group indexes or indicate if the lowest or highest N PHICH group is indicated. As another example, a mapping from PUSCH resource to the PHICH group indexes can be defined, as elaborated below.

The mapping from PUSCH resources to MPDCCH PRB indexes or PHICH group indexes can be defined as follows. If there is only one MPDCCH PRB or PHICH group for each PUSCH, the index of PRB or PHICH group may be denoted by X. X can be defined as follows:

$$X=(I_{RA}^{UL}+n_{DMRS}+n_{ID}) \bmod(n_{ETS}),$$

where:

$I_{RA}^{UL}$ is the lowest index of allocated resource unit for the PUSCH transmission. Note that here the resource unit may be different from RU defined in NB-IoT. A resource unit here may refer to 1 PRB if a sub-PRB allocation is not configured, and z tones if a sub-PRB allocation is configured, where z is the smallest sub-PRB allocation unit supported in efeMTC, e.g. z=3.

$n_{DMRS}$ is the DMRS cyclic shift index used by the PUSCH DMRS. The DMRS cyclic shift index may be used when UEs are multiplexed on the same REs (e.g. via CDMA). The DMRS cyclic shift index may be is 0 if no CDMA is supported. Otherwise, the range of the possible values for the parameter $n_{DMRS}$ may depend on the number of UEs that can be multiplexed via CDMA.

$n_{ID}$ is parameter that can be used to further differentiate UEs, where $n_{ID}$ can depend on the UE ID (e.g. C-RNTI). Alternatively, $n_{ID}$ can be configured by higher layer signaling. If $n_{ID}$ is configured by higher layer signaling, the absence of $n_{ID}$ may mean the value of $n_{ID}$ is 0.

$n_{ETS}$ is the number of MPDCCH PRBs or PHICH groups.

The DMRS sequence used for a PHICH-based ETS can be configured by the eNB for each UE. Alternatively, the DMRS sequence may be associated with the UE ID, e.g. UE ID mod 8.

The PHICH orthogonal sequence index and/or OCC for a PHICH group can be determined as follows:

$$n_{seq\text{-}ETS}=(I_{RA}^{UL}+n_{DMRS}+n_{ID}) \bmod(n_{spreading\text{-}ETS}),$$

where $n_{spreading\text{-}ETS}$ is the spreading factor, i.e. the total number of PHICHs that can be multiplexed on the same REs, e.g. the number of orthogonal PHICH sequences per PHICH symbol multiplied by the number of OCC in the time domain for the PHICH. The spreading factor can be 8 for a PHICH-based ETS, as 8 orthogonal sequences are defined in legacy LTE for each PHICH group. Alternatively, in additional to the 8 orthogonal sequences, a time domain OCC (e.g. Hadamard sequence) can also be used for a PHICH with repetitions. For example, the PHICH can be repeated over last 11 symbols of one subframe, and length-11 orthogonal sequences can be applied. In this case, the $n_{DMRS}$ is 8*number of OCC (e.g. 11).

$n_{seq\text{-}ETS}$ is the index for the combination of orthogonal sequence and OCC (if OCC in time domain is supported). For example, the orthogonal PHICH sequence index can be obtained by floor ($n_{seq\text{-}ETS}/n_{occ}$) and the OCC index can be ($n_{seq\text{-}ETS}$ mod $n_{occ}$).

If there is multiple PDCCH PRBs or PHICH groups, the index may be denoted by X and the number of PRBs/PHICH groups may be denoted by M. An extension from the above mapping with 1 PRB/PHICH group can be used. For example, the $m^{th}$ index can be $X_m=(X+m-1) \bmod n_{ETS}$, or $X_m=(X-m+1) \bmod n_{ETS}$, where $X=(M*(I_{RA}^{UL}+n_{DMRS}+n_{ID})) \bmod (n_{ETS})$, and m=1, 2, ..., M.

For the above methods, in one embodiment, the ETS may be transmitted only when there is an ACK for a PUSCH TBS. In another embodiment, the ETS may be transmitted in both ACK and NACK cases, with 1 bit information to differentiate ACK and NACK. Further, the above embodiments assume that the NB consists of continuous 6 PRBs. In another embodiment, the NB can be defined as different granularity, e.g. 5 MHz or 1 PRB (e.g., for feNB-IoT). In this case, the above methodologies should be scaled correspondingly.

Note that in some embodiments, if the ETS is not transmitted periodically, but only after the end of the PUSCH transmission, the ETS may function merely as a HARQ-ACK feedback for the PUSCH transmission. Thus, the above methods can also be applied to HARQ-ACK feedback as well.

In some cases, the ETS may not be received, perhaps due to instantaneous channel conditions, although the eNB may believe that the UE received the ETS and in response may terminate the PUSCH transmission. To handle the error case where the ETS is missed, a number of methods can be considered. In one embodiment, the eNB can merely continue to reserve the resource used during the scheduled PUSCH repetitions. This may avoid a potential collision between the UE, which missed the ACK contained in the ETS and thus may continue to send the PUSCH transmission, and another UE, which may be scheduled by the eNB with the same resource during the remaining PUSCH duration (as the eNB, which having successfully received the PUSCH transmission from the UE, may assume that the PUSCH transmission is to be terminated after the ETS with ACK feedback).

In one embodiment, the eNB may schedule the UE with a good channel status using the same frequency resource during the remaining PUSCH duration after transmission of the ETS with ACK feedback. The eNB may perform Successive Interference Cancellation (SIC) if desired. In one embodiment, a larger number of repetitions can be configured for the ETS, resulting in a tradeoff between the power saving gain and the possibility of error cases.

In one embodiment, the eNB may reserve a part of the resource (e.g. one more cycle of ETS monitoring occasions), and detect whether the UE continues transmission in the following reserved resource. If the eNB determines that the UE continues to transmit, the eNB may transmit another ACK. The eNB can use a correlation or decoding-based detection method to decide whether the UE continues the PUSCH transmission. The detection can be based on K subframes before an ACK transmission and M subframes after the ACK transmission, where K and M can be up to the eNB implementation. In another embodiment, the eNB implementation may determine which one or combination of the above methods to handle the error case.

Figure 12:
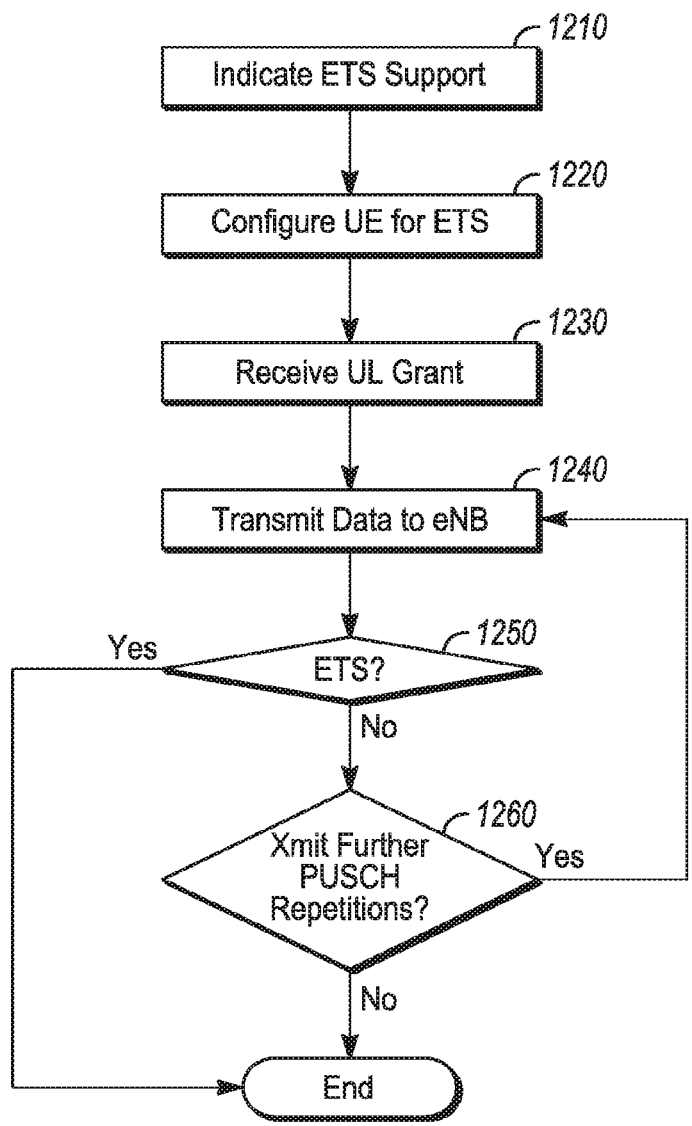
FIG. 12 illustrates an ETS flowchart in accordance with some embodiments.

Thus, the various embodiments above support an ETS from the eNB to the UE for a PUSCH transmission from the UE. FIG. 12 illustrates an ETS flowchart in accordance with some embodiments. The UE and eNB may be similar to those described above. The operations may occur in a different order than that shown, and some operations may not be shown for convenience. The UE may, at operation 1210, indicate to the eNB support for ETS transmissions. The UE may provide the ETS support indication via capability signaling. The capability signaling may be provided in an RRC connection during initial attachment. Note that the capability signaling, like the various messages described herein, may be encoded prior to transmission by the transmitting entity (UE or eNB) and decoded after reception by the receiving entity (eNB or UE).

After determining that the UE is able to support the ETS, the eNB may at operation 1220 configure the UE for the ETS. The ETS can be configured, for example, semi-statically via high layer signaling. The ETS configuration may include the UE mode to which the ETS signal applies (e.g., CE mode B only) as well as the physical design of the ETS and resources to be used for the ETS. For example, the ETS can be based on the MPDCCH transmission, where existing DCI formats, e.g. 6-0A/6-0B, can be reused, or a new DCI format can be defined. Alternatively, the ETS can be based on a PHICH transmission, with the PHICH transmission extended to be bandwidth limited and can repeated in the time domain for coverage enhancement. Alternatively, the ETS can be based on certain sequence.

The UE may, after the ETS is configured, receive an uplink grant from the eNB at operation 1230. The grant may be transmitted on a PDCCH/ePDCCH/MPDCCH, dependent on the UE and UE mode.

The UE may, after the ETS is configured, transmit uplink data to the eNB at operation 1240. The data may be transmitted on a PUSCH. If the UE operates in TDD or HD-FDD, a gap may be present between the grant and UL transmission.

The UL data may continue to be transmitted for a predetermined until the time to determine whether the eNB has transmitted the configured ETS. The ETS may have a fixed timing relationship with respect to the PUSCH. At this point, the UE may switch from the transmitter chain to the receiver chain (if TDD or HD-FDD mode) and may switch to a different frequency during the 1 subframe switching period. The UE may determine whether the eNB has transmitted an ETS at operation 1250, as well as and perhaps what the ETS indicates if detected. The ETS frequency resource can be predefined, be configured by high layer signaling, and/or can be based on the frequency resource used for the PUSCH transmission. The ETS may be transmitted in a single occurrence in a single subframe or may be transmitted over multiple subframes prior to the UE switching back to transmit further iterations of the PUSCH data. The ETS can be transmitted by the eNB only when there is an ACK feedback or may be transmitted for both ACK and NACK and contain an indication of to which of the ACK/NACK the ETS corresponds.

The UE may monitor for the ETS during transmission of the data. for example in the case of FD-FDD (in which monitoring of the ETS may start from the start of the PUSCH transmission), or after transmission of the data for a predetermined number of the repetitions. During the time period that the UE monitors for the ETS, the UE may avoid simultaneously monitoring other DCI formats or may simultaneously monitor ETS and other DCIs. In the latter case, the blind decoding attempts of other DCIs may be restricted to keep the total number of DCI blind decoding attempts the same as in Rel-13 eMTC for each time instance. In this case, a new search space may be defined for an MPDCCH-based ETS.

Alternatively, the ETS search space and other USS/CSS search spaces can overlap. When overlapped, a priority can be set for the ETS search space and the other USS/CSS. In some cases, the entire search space that has the lower priority can be dropped. In other embodiments, only the candidates in the search space having the lower priority but overlapped with the search space with the high priority may be dropped. These candidates may instead be deferred on the subframes overlapped with the high priority search space.

When the UE determines that no ETS has been transmitted, or that the ETS indicates a NACK for the PUSCH transmission, the UE may decide whether further PUSCH transmissions are to be sent. The UE may determine whether the PUSCH repetitions, e.g., for the CE mode in which the UE is operating, have been completed at operation 1260. In addition, the ETS can be configured to be periodic over sets of one or more subframes, with the sets separated by sets of PUSCH transmissions. The number of PUSCH repetitions (or subframes) may be the same or may be different after each set of ETS subframes, or (as shown in FIG. 11) may have an initial value and then use fewer subframes.

In some embodiments, explicit HARQ-ACK feedback for termination of MPDCCH monitoring and HARQ-ACK feedback for termination of the PUSCH transmission may be used. Such feedback may include a DRX command. In this case, the payload of the HARQ-ACK feedback for the different instances can be different by setting different default values in predetermined fields in the DCI. Alternately, the payloads be the same.

Examples

Example 1 is an apparatus of user equipment (UE), the apparatus comprising: processing circuitry arranged to: decode, from an evolved NodeB (eNB), a schedule for repeated transmissions of data on a physical uplink shared channel (PUSCH); encode, for transmission to the eNB, repetitions of the data on the PUSCH; during transmission of the data or after transmission of a predetermined number of the repetitions of the data, monitor for an early termination signal (ETS) that indicates successful reception of the data by the eNB; and in response to reception of the ETS signal, terminate one of transmission of remaining repetitions of the data or monitoring of a machine type communication (MTC) Physical Downlink Control Channel (MPDCCH); and a memory configured to store a configuration of the ETS that indicates specifics of reception of the ETS.

In Example 2, the subject matter of Example 1 includes, wherein: the processing circuitry is further arranged to encode, for transmission to the eNB, capability information that indicates that the UE supports use of the ETS, and use of ETS is configured by the eNB after transmission of the capability information.

In Example 3, the subject matter of Examples 1-2 includes, wherein the processing circuitry is further arranged to: monitor the MPDCCH for the ETS when the UE is in coverage enhancement (CE) mode B and avoid monitoring for the ETS when the UE is in CE mode A; and monitor the MPDCCH for Hybrid Automatic Repeat Request Acknowledgment (HARQ-ACK) feedback for early termination for PUSCH transmissions confirming reception of a Radio Resource Control (RRC) Connection Release message when the UE is in CE mode A or B.

In Example 4, the subject matter of Example 3 includes, wherein the processing circuitry is further arranged to: determine that the ETS is present in response to a determination that a first field in downlink control information (DCI) of the MPDCCH is set to a first default value.

In Example 5, the subject matter of Example 4 includes, wherein: the processing circuitry is further arranged to determine that the HARQ-ACK feedback is present in response to a determination that a second field in a DCI of the MPDCCH is set to a second default value, and at least one of: the first and second fields are different, or the first and second default values are different.

In Example 6, the subject matter of Example 5 includes, wherein: the first field is a resource block assignment field that is set to an assignment field default value in CE mode A and the second field is a Modulation and Coding Scheme (MCS) field that is set to an MCS field default value in CE mode B for an indication of HARQ-ACK, and other fields are set to individual default values as validation bits.

In Example 7, the subject matter of Examples 5-6 includes, wherein: the DCI is formed in accordance with DCI format 6-0A or 6-0B; and the processing circuitry is further arranged to determine use of the ETS via reuse of the DCI format 6-0A or 6-0B.

In Example 8, the subject matter of Examples 4-7 includes, wherein: the DCI is a compact DCI having a size of 2 bits plus cyclic redundancy code (CRC) bits.

In Example 9, the subject matter of Examples 4-8 includes, wherein: the DCI is a compact DCI having a size of N bits plus M cyclic redundancy code (CRC) bits, the N bits configured to indicate HARQ-ACK for a HARQ process and a number of repetitions of the data to be transmitted by the UE after the ETS when the ETS indicates a negative acknowledgment (NACK).

In Example 10, the subject matter of Examples 1-9 includes, wherein: an ETS search space overlaps with at least one of a UE-specific shared space (USS) or a common search space (CSS), the ETS and at least one of the USS or CSS have different priorities, the processing circuitry is further arranged to monitor a higher priority search space and drop monitoring of a lower priority search space that overlaps with the higher priority search space.

In Example 11, the subject matter of Examples 1-10 includes, wherein: an ETS search space overlaps with at least one of a UE-specific shared space (USS) or a common search space (CSS), the ETS and at least one of the USS or CSS have different priorities, the processing circuitry is further arranged to monitor a higher priority search space and defer monitoring of a lower priority search space until after subframes to monitor for the higher priority search space.

In Example 12, the subject matter of Examples 1-11 includes, wherein: an ETS search space overlaps with at least one of a UE-specific shared space (USS) or a common search space (CSS), the ETS and at least one of the USS or CSS have different priorities, the processing circuitry is further arranged to monitor a first set of candidates of a lower priority search space that overlaps with the higher priority search space and skip monitoring of remaining candidates of the lower priority search space.

In Example 13, the subject matter of Examples 1-12 includes, wherein: the processing circuitry is further arranged to simultaneously monitor the MPDCCH and ETS, and an uplink grant having a same Hybrid Automatic Repeat Request (HARQ) process number as transmissions on the PUSCH terminates remaining repetitions of the PUSCH.

In Example 14, the subject matter of Examples 1-13 includes, wherein the processing circuitry is further arranged to: monitor for the ETS when the schedule indicates that a scheduled number of the repetitions exceeds a predefined number of the repetitions.

In Example 15, the subject matter of Examples 1-14 includes, wherein the processing circuitry is further arranged to: enter sleep mode after detection of the ETS for termination of MPDCCH monitoring.

In Example 16, the subject matter of Examples 1-15 includes, wherein: a presence of the ETS indicates that the data has been received by the eNB, or the ETS comprises an indication of whether the data has been received by the eNB.

In Example 17, the subject matter of Examples 1-16 includes, wherein: the processing circuitry is further arranged to encode the PUSCH for transmission on multiple sets of subframes separated by at least one subframe of ETS monitoring, at least some of the sets of subframes have different numbers of subframes, and at least one of the sets of subframes or the at least one subframe is dependent on a coverage level of the UE.

In Example 18, the subject matter of Example 17 includes, wherein: a set of subframes for an initial PUSCH transmission is longer than sets of subframes for later PUSCH transmissions after the initial PUSCH transmission, and the sets of subframes for the later PUSCH transmissions have a same number of subframes.

In Example 19, the subject matter of Examples 17-18 includes, wherein: the at least one subframe of ETS monitoring has a duration limited to a single ETS transmission.

In Example 20, the subject matter of Examples 17-19 includes, wherein: the at least one subframe of ETS monitoring has a duration corresponding to multiple ETS transmissions.

In Example 21, the subject matter of Examples 1-20 includes, wherein: the schedule is received on a machine type communication (MTC) Physical Downlink Control Channel (MPDCCH), the processing circuitry is further arranged to monitor a subset of physical resource blocks (PRBs) of the MPDCCH for the ETS, and at least one of a number or placement of PRBs of the subset is based on a coverage level of the UE.

In Example 22, the subject matter of Examples 1-21 includes, wherein: the processing circuitry comprises a baseband processor configured to encode transmissions to, and decode transmissions from, the eNB.

Example 23 is an apparatus of evolved NodeB (eNB), the apparatus comprising: processing circuitry arranged to: decode, from a user equipment (UE), capability information that indicates that the UE supports use of an early termination signal (ETS) from the eNB, the ETS configured to indicate successful reception by the eNB of data transmitted by the UE on a physical uplink shared channel (PUSCH); encode, for transmission to the UE on a machine type communication (MTC) Physical Downlink Control Channel (MPDCCH), a schedule for transmissions of the data and ETS monitoring instances for the ETS from the eNB, the schedule based on a coverage level of the UE; determine whether the data transmitted by the UE has been successfully decoded; in response to a determination that the data has been successfully decoded, transmit the ETS during one of the monitoring instances closest in time after the determination, the ETS configured to indicate early termination of one of repeated instances of the data prior to an end of a scheduled transmission period or early termination of MPDCCH monitoring; and a memory configured to store the schedule.

In Example 24, the subject matter of Example 23 includes, wherein: the processing circuitry is further arranged to encode, for transmission to the UE, Hybrid Automatic Repeat Request Acknowledgment (HARQ-ACK) feedback for early termination for PUSCH transmissions confirming reception of a Radio Resource Control (RRC) Connection Release message, and at least one of: the processing circuitry is further arranged to indicate the ETS by setting a first field in downlink control information (DCI) of the MPDCCH a first default value and indicate the HARQ-ACK feedback by setting a second field in a DCI of the MPDCCH to a second default value, and at least one of: the first and second fields are different, or the first and second default values are different, or the DCI is a compact DCI having a size of N bits plus M cyclic redundancy code (CRC) bits, the N bits configured to indicate HARQ-ACK for a HARQ process and a number of repetitions of the data to be transmitted by the UE after the ETS when the ETS indicates a negative acknowledgment (NACK).

In Example 25, the subject matter of Examples 23-24 includes, wherein: a presence of the ETS indicates that the data has been received by the eNB, or the ETS comprises an acknowledgment (ACK) or negative acknowledgment (NACK) that indicates whether the data has been received by the eNB.

In Example 26, the subject matter of Examples 23-25 includes, wherein one of: the schedule indicates transmission of the PUSCH in multiple sets of subframes separated by at least one subframe of ETS monitoring, at least some of the sets of subframes have different numbers of subframes, and at least one of the sets of subframes or the at least one subframe is dependent on the coverage level of the UE; the schedule indicates a subset of physical resource blocks (PRBs) of the MPDCCH to monitor for the ETS, and at least one of a number or placement of PRBs of the subset is based on the coverage level of the UE, or the schedule reserves the PUSCH for the scheduled transmission period for the UE regardless of whether the ETS is transmitted.

In Example 27, the subject matter of Examples 23-26 includes, wherein the processing circuitry is further arranged to: reschedule resources used by the PUSCH for a different transmission during a portion of the scheduled transmission period remaining after the ETS is transmitted.

In Example 28, the subject matter of Examples 23-27 includes, wherein the processing circuitry is further arranged to: determine, after transmission of the ETS, whether the data continues to be transmitted on the PUSCH, and in response to a determination that the data continues to be transmitted on the PUSCH, retransmit the ETS in a subsequent ETS monitoring instance.

Example 29 is a computer-readable storage medium that stores instructions for execution by one or more processors of a user equipment (UE), the one or more processors to configure the UE to, when the instructions are executed: transmit, to an evolved NodeB (eNB), capability information that indicates that the UE supports use of an early termination signal (ETS) from the eNB on a machine type communication (MTC) Physical Downlink Control Channel (MPDCCH), the ETS configured to indicate successful reception by the eNB of data transmitted by the UE on a physical uplink shared channel (PUSCH), receive, from the eNB, a schedule for repeated transmissions of data on the PUSCH, the schedule based on a coverage level of the UE; encode, for transmission to the eNB, repetitions of the data on the PUSCH; after transmission of the data for a predetermined number of the repetitions of the data or during the transmission of the data, monitor the MPDCCH for the ETS; and in response to reception of the ETS signal, terminate transmission of remaining repetitions of the data when there are remaining repetitions, and enter a sleep mode when the ETS is for early termination of MPDCCH monitoring.

In Example 30, the subject matter of Example 29 includes, wherein one of: the instructions, when executed, further configure the UE to determine the ETS from downlink control information (DCI) of the MPDCCH by one of: determining that at least one field of the DCI is set to a default value, the DCI having an existing DCI format, or determining that the DCI is a compact DCI having a size of N bits plus M cyclic redundancy code (CRC) bits, the N bits configured to indicate HARQ-ACK for a HARQ process and a number of repetitions of the data to be transmitted by the UE after the ETS when the ETS indicates a negative acknowledgment (NACK), or a presence of the ETS indicates that the data has been received by the eNB or the ETS comprises an acknowledgment (ACK) or negative acknowledgment (NACK) that indicates whether the data has been received by the eNB.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A method, comprising:
  determining support of an indication of early termination by a user equipment (UE) based on capability information that indicates that the UE supports use of the indication of early termination from a base station, wherein the indication of early termination is configured to indicate early termination of repetitions of data transmitted by the UE on a physical uplink shared channel (PUSCH);
  encoding, for transmission to the UE on a machine type communication (MTC) Physical Downlink Control

Channel (MPDCCH), scheduling of the repetitions of the data transmitted by the UE on the PUSCH; and transmitting the indication of early termination during one of one or more monitoring instances closest in time after the determination, wherein the indication of early termination is configured to indicate early termination of one of repeated instances of the data prior to an end of the repetitions of the data.

2. The method of claim 1, wherein determining reception of the indication of early termination that indicates acknowledgement (ACK), feedback for the data is based on at least one of:
 a resource block assignment field in downlink control information, (DCI) that is set to all ones and at least one other field set to zero, or
 a Modulation and Coding Scheme, MCS, field in the DCI that is set to all ones and at least one other field set to zero, wherein the DCI is one of DCI format 6-0A or 6-0B.

3. The method of claim 1, further comprising:

encoding, for transmission to the UE, Hybrid Automatic Repeat Request Acknowledgment (HARQ-ACK) feedback for early termination for PUSCH transmissions confirming reception of a Radio Resource Control (RRC) Connection Release message, and wherein at least one of:
 the method further comprises:
  indicating early termination by setting a first field in downlink control information (DCI) of the MPDCCH a first default value and indicating the HARQ-ACK feedback by setting a second field in a DCI of the MPDCCH to a second default value, and at least one of:
   the first and second fields are different, or the first and second default values are different, or
   the DCI is a compact DCI having a size of N bits plus M cyclic redundancy code (CRC) bits, the N bits configured to indicate HARQ-ACK for a HARQ process and a number of repetitions of the data to be transmitted by the UE after the indication of early termination when the indication of early termination indicates a negative acknowledgment (NACK).

4. The method of claim 1, wherein:

a presence of the indication of early termination indicates that the data has been received by the base station, or the indication of early termination comprises an acknowledgment (ACK) or negative acknowledgment (NACK) that indicates whether the data has been received by the base station.

5. The method of claim 1, wherein the scheduling of repetitions of data transmitted by the UE on the PUSCH indicates transmission of the PUSCH in multiple sets of subframes separated by at least one subframe of the indication of early termination monitoring, at least some of the sets of subframes have different numbers of subframes, and at least one of the sets of subframes or the at least one subframe is dependent on a coverage level of the UE.

6. A method, comprising:

decoding, from a base station, scheduling of repetitions of data transmitted by a user equipment (UE) on a physical uplink shared channel (PUSCH);

encoding, for transmission to a base station, repetitions of the data on the PUSCH;

during transmission of the data or after transmission of a predetermined number of the repetitions of the data, monitoring for an indication of early termination;

terminating one of transmission of remaining repetitions of the data or monitoring of a machine type communication (MTC) Physical Downlink Control Channel (MPDCCH); and determining reception of the indication of early termination that indicates acknowledgement (ACK) feedback for the data based on at least one of:
 a resource block assignment field in downlink control information (DCI) that is set to all ones and at least one other field set to zero; or
 a Modulation and Coding Scheme (MCS) field in the DCI that is set to all ones and at least one other field set to zero, wherein the DCI is one of DCI format 6-0A or 6-0B.

7. The method of claim 6, further comprising:

determining the indication of early termination from DCI of the MPDCCH by at least one of:
 determining that at least one field of the DCI is set to a default value, the DCI having an existing DCI format,
 determining that the DCI is a compact DCI having a size of N bits plus M cyclic redundancy code (CRC) bits, the N bits configured to indicate Hybrid Automatic Repeat Request-Acknowledgment (HARQ-ACK) for a HARQ process and a number of repetitions of the data to be transmitted by the UE after the indication of early termination when the indication of early termination indicates a negative acknowledgment (NACK),
 a presence of the indication of early termination indicates that the data has been received by the base station or the indication of early termination comprises an ACK, or
 a NACK that indicates whether the data has been received by the base station.

8. The method of claim 6, further comprising:

encoding, for transmission to the base station, capability information that indicates that the UE supports use of the indication of early termination, wherein the indication of early termination is to be transmitted after transmission of the capability information.

9. The method of claim 6, further comprising:

monitoring the MPDCCH for the indication of early termination when the UE is in coverage enhancement (CE) mode B and avoiding monitoring for the indication of early termination when the UE is in CE mode A; and monitoring the MPDCCH for Hybrid Automatic Repeat Request-Acknowledgment (HARQ-ACK) feedback for early termination for PUSCH transmissions confirming reception of a Radio Resource Control (RRC) Connection Release message when the UE is in CE mode A or B.

10. The method of claim 9, further comprising:

determining that the indication for early termination is present in response to a determination that a first field in DCI of the MPDCCH is set to a first default value.

11. The method of claim 10, further comprising:

determining that the HARQ-ACK feedback is present in response to a determination that a second field in a DCI of the MPDCCH is set to a second default value, wherein at least one of:
 the first and second fields are different, or
 the first and second default values are different.

12. The method of claim 10, wherein:
the DCI is a compact DCI having a size of 2 bits plus cyclic redundancy code (CRC) bits.

13. The method of claim 10, wherein:
the DCI is a compact DCI having a size of N bits plus M cyclic redundancy code (CRC) bits, the N bits configured to indicate HARQ-ACK for a HARQ process and a number of repetitions of the data to be transmitted by the UE after the indication of early termination when the indication of early termination indicates a negative acknowledgment (NACK).

14. The method of claim 6, wherein:
an indication of early termination search space overlaps with at least one of a UE-specific shared space (USS) or a common search space (CSS),
the indication of early termination and at least one of the USS or CSS have different priorities, and the method further comprises:
monitoring a higher priority search space of the indication of early termination and at least one of the USS or CSS and dropping monitoring of a lower priority search space of the indication of early termination and at least one of the USS or CSS that overlaps with the higher priority search space.

15. The method of claim 6, wherein:
an indication of early termination search space overlaps with at least one of a UE-specific shared space (USS) or a common search space (CSS),
the indication of early termination and at least one of the USS or CSS have different priorities, and the method further comprises:
monitoring a higher priority search space of the indication of early termination and at least one of the USS or CSS and deferring monitoring of a lower priority search space of the indication of early termination and at least one of the USS or CSS that until after subframes to monitor for the higher priority search space.

16. The method of claim 6, wherein:
an indication of early termination search space overlaps with at least one of a UE-specific shared space (USS) or a common search space (CSS),
the indication of early termination and at least one of the USS or CSS have different priorities, and the method further comprises:
monitoring a first set of candidates of a lower priority search space that overlaps with a higher priority search space and skipping monitoring of remaining candidates of the lower priority search space.

17. A processor, comprising: memory storing instructions that, when executed, cause the processor to:
determine support of an indication of early termination by a user equipment (UE) based on capability information that indicates that the UE supports use of the indication of early termination from a base station, wherein the indication of early termination is configured to indicate early termination of repetitions of data transmitted by the UE on a physical uplink shared channel (PUSCH);
encode, for transmission to the UE on a machine type communication (MTC) Physical Downlink Control Channel (MPDCCH), scheduling of the repetitions of the data transmitted by the UE on the PUSCH; and
transmit the indication of early termination during one of one or more monitoring instances closest in time after the determination, wherein the indication of early termination is configured to indicate early termination of one of repeated instances of the data prior to an end of the repetitions of the data.

18. The processor of claim 17, wherein
determining reception of the indication of early termination that indicates acknowledgement (ACK), feedback for the data is based on at least one of:
a resource block assignment field in downlink control information; (DCI) that is set to all ones and at least one other field set to zero; or
a Modulation and Coding Scheme, MCS, field in the DCI that is set to all ones and at least one other field set to zero, wherein the DCI is one of DCI format 6-0A or 6-0B.

19. The processor of claim 17, wherein the instructions are further executable to cause the processor to:
encode, for transmission to the UE, Hybrid Automatic Repeat Request Acknowledgment (HARQ-ACK) feedback for early termination for PUSCH transmissions confirming reception of a Radio Resource Control (RRC) Connection Release message, and wherein the instructions are further executable to cause the processor to:
indicate early termination by setting a first field in downlink control information (DCI) of the MPDCCH a first default value and indicating the HARQ-ACK feedback by setting a second field in a DCI of the MPDCCH to a second default value, and at least one of:
the first and second fields are different, or the first and second default values are different, or
the DCI is a compact DCI having a size of N bits plus M cyclic redundancy code (CRC) bits, the N bits configured to indicate HARQ-ACK for a HARQ process and a number of repetitions of the data to be transmitted by the UE after the indication of early termination when the indication of early termination indicates a negative acknowledgment (NACK).

20. The processor of claim 17, wherein:
a presence of the indication of early termination indicates that the data has been received by a base station, or
the indication of early termination comprises an acknowledgment (ACK) or negative acknowledgment (NACK) that indicates whether the data has been received by the base station.

* * * * *